(12) United States Patent
Jung et al.

(10) Patent No.: US 11,546,459 B2
(45) Date of Patent: Jan. 3, 2023

(54) ELECTRONIC DEVICE AND METHOD FOR SWITCHING OF ANTENNA THEREOF

(71) Applicant: Samsung Electronics Co., Ltd., Suwon-si (KR)

(72) Inventors: Hojin Jung, Suwon-si (KR); Yongyoun Kim, Suwon-si (KR); Myeongsu Oh, Suwon-si (KR); Duho Chu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/116,301

(22) Filed: Dec. 9, 2020

(65) Prior Publication Data
US 2021/0185164 A1 Jun. 17, 2021

(30) Foreign Application Priority Data

Dec. 13, 2019 (KR) .................. 10-2019-0166422
Aug. 4, 2020 (KR) .................. 10-2020-0097130

(51) Int. Cl.
*H04M 1/72454* (2021.01)
*H04M 1/02* (2006.01)

(52) U.S. Cl.
CPC ..... *H04M 1/72454* (2021.01); *H04M 1/0216* (2013.01)

(58) Field of Classification Search
CPC ........ H01Q 3/24; H01Q 1/243; H04B 1/1009; H04B 7/0834; H04B 7/0602;
(Continued)

(56) References Cited

U.S. PATENT DOCUMENTS 8,725,213 B2 5/2014 Nakamura
9,413,443 B2 8/2016 Kim
(Continued)

FOREIGN PATENT DOCUMENTS

CN 107465433 A 12/2017
JP 5763543 B2 8/2015
(Continued)

OTHER PUBLICATIONS

International Search Report dated Mar. 5, 2021, issued in International Application No. PCT/KR2020/017954.
(Continued)

*Primary Examiner* — Lester G Kincaid
*Assistant Examiner* — Maryam Soltanzadeh
(74) *Attorney, Agent, or Firm* — Jefferson IP Law, LLP

(57) ABSTRACT

An electronic device is provided. The electronic device includes a foldable housing, a communication circuit, a first transmission/reception circuit configured to transmit/receive a signal in a first frequency band, a first antenna electrically connected to the first transmission/reception circuit, and disposed on a portion of the first side member, a second transmission/reception circuit configured to transmit/receive a signal in a second frequency band different from the first frequency band, a second antenna electrically connected to the second transmission/reception circuit, and disposed on a portion of the first side member, a sensor configured to detect a contact of a user's body portion, and a processor. The processor may be configured to cause the first transmission/reception circuit to be electrically connected to the second antenna such that the signal in the first frequency band is transmitted/received through the second antenna when the contact of the user's body portion is detected by the sensor.

20 Claims, 26 Drawing Sheets

(58) Field of Classification Search
CPC ............ H04B 7/0802; H04M 2250/12; H04M 1/0214; H04M 1/72454; H04M 1/0216
See application file for complete search history.

(56) References Cited

U.S. PATENT DOCUMENTS

| | | | |
|---|---|---|---|
| 10,224,611 B2 | 3/2019 | Hong et al. | |
| 10,812,635 B2 | 10/2020 | He et al. | |
| 2012/0196651 A1* | 8/2012 | Nakamura | H04B 7/0834 455/566 |
| 2013/0308608 A1* | 11/2013 | Hu | H01Q 3/24 370/334 |
| 2014/0169243 A1* | 6/2014 | Khlat | H04B 7/0602 370/297 |
| 2015/0044977 A1 | 2/2015 | Ramasamy et al. | |
| 2017/0373712 A1* | 12/2017 | Kim | H04B 1/3833 |
| 2018/0342794 A1* | 11/2018 | Han | H04B 1/401 |
| 2019/0109363 A1* | 4/2019 | Okabe | H04B 1/0483 |
| 2019/0393918 A1* | 12/2019 | Han | G06T 7/55 |

FOREIGN PATENT DOCUMENTS

| | | |
|---|---|---|
| KR | 10-0319269 A | 12/2001 |
| KR | 10-2007-0082308 A | 8/2007 |
| KR | 10-2013-0021121 A | 3/2013 |
| KR | 10-2017-0141998 A | 12/2017 |
| WO | 2019/041974 A1 | 3/2019 |

OTHER PUBLICATIONS

Indian Office Action dated Oct. 20, 2022, issued in Indian Application No. 202217032844.
Extended European Search Report dated Oct. 27, 2022, issued in European Application No. 20899469.9 -1206.

* cited by examiner

ELECTRONIC DEVICE AND METHOD FOR SWITCHING OF ANTENNA THEREOF

CROSS-REFERENCE TO RELATED APPLICATION(S)

This application is based on and claims priority under 35 U.S.C. § 119(a) of a Korean patent application number 10-2019-0166422, filed on Dec. 13, 2019, in the Korean Intellectual Property Office, and of a Korean patent application number 10-2020-0097130, filed on Aug. 4, 2020, in the Korean Intellectual Property Office, the disclosure of each of which is incorporated by reference herein in its entirety.

BACKGROUND

1. Field

The disclosure relates to an electronic device including an antenna and a method of switching the antenna thereof.

2. Description of Related Art

Electronic devices having various structures are on the market. An electronic device may be formed in, for example, a folding structure, and may include a flip cover, a dual display, or a flexible display.

An electronic device may provide a mobile communication service using an antenna. The antenna of the electronic device may be disposed in a region inside and/or outside a housing.

The above information is presented as background information only to assist with an understanding of the disclosure. No determination has been made, and no assertion is made, as to whether any of the above might be applicable as prior art with regard to the disclosure.

SUMMARY

A foldable electronic device may be in a folded state or an unfolded state about a hinge structure. The foldable electronic device may operate in an in-folding or out-folding method. The outer surface of the housing of the foldable electronic device may be formed of a metal material (a conductive portion), and a portion of the metal material may be used as an antenna (or a radiator). When the metal material formed in the housing of the foldable electronic device is used as an antenna, an antenna performance degradation phenomenon (e.g., death grip) may occur due to contact with a part of a user's body in the state in which the user carries and uses the electronic device.

Aspects of the disclosure are to address at least the above-mentioned problems and/or disadvantages and to provide at least the advantages described below. Accordingly, an aspect of the disclosure is to provide an apparatus and method for antenna switching.

Additional aspects will be set forth in part in the description which follows and, in part, will be apparent from the description, or may be learned by practice of the presented embodiments.

In accordance with an aspect of the disclosure, an electronic device is provided. The electronic device includes a foldable housing, a communication circuit, a first transmission/reception circuit configured to transmit/receive a signal in a first frequency band, a first antenna electrically connected to the first transmission/reception circuit, and disposed on a portion of the first side member, a second transmission/reception circuit configured to transmit/receive a signal in a second frequency band different from the first frequency band, a second antenna electrically connected to the second transmission/reception circuit, and disposed on a portion of the first side member, a sensor configured to detect a contact of a user's body portion, and a processor. The foldable housing may include a hinge structure, a first housing structure connected to the hinge structure and including a first surface oriented to face a first direction, a second surface oriented to face a second direction opposite to the first surface, and a first side member surrounding a first space between the first surface and the second surface, and a second housing structure connected to the hinge structure and including a third surface oriented to face a third direction, a fourth surface oriented to face a fourth direction opposite to the third direction, and a second side member surrounding a second space between the third surface and the fourth surface. The second housing structure may be folded to the first housing structure about the hinge structure, wherein, in a folded state, the third direction is opposite to the first direction, and in an unfolded state, the third direction is a same as the first direction. According to various embodiments, the processor may be configured to cause the first transmission/reception circuit to be electrically connected to the second antenna such that the signal in the first frequency band is transmitted/received through the second antenna when the contact of the user's body portion is detected by the sensor.

In accordance with another aspect of the disclosure, an electronic device is provided. The electronic device includes a foldable housing, a communication circuit, a first transmission/reception circuit configured to transmit/receive a signal in a first frequency band, a first antenna electrically connected to the first transmission/reception circuit, and disposed on a portion of the first side member, a second transmission/reception circuit configured to transmit/receive a signal in a second frequency band different from the first frequency band, a second antenna electrically connected to the second transmission/reception circuit, and disposed on a portion of the first side member, a bidirectional coupler disposed in an electrical path connecting the communication circuit and the first antenna, and a processor. The foldable housing may include a hinge structure, a first housing structure connected to the hinge structure and including a first surface oriented to face a first direction, a second surface oriented to face a second direction opposite to the first surface, and a first side member surrounding a first space between the first surface and the second surface, and a second housing structure connected to the hinge structure and including a third surface oriented to face a third direction, a fourth surface oriented to face a fourth direction opposite to the third direction, and a second side member surrounding a second space between the third surface and the fourth surface. The second housing structure is folded to the first housing structure about the hinge structure, wherein, in a folded state, the third direction is opposite to the first direction, and in an unfolded state, the third direction is a same as the first direction. According to various embodiments, the processor may be configured to cause the first transmission/reception circuit to be electrically connected to the second antenna such that the signal in the first frequency band is transmitted/received through the second antenna when the contact of the user's body portion is detected through the bidirectional coupler.

An electronic device according to various embodiments is capable of preventing antenna performance degradation even in a situation in which antenna performance deterioration may occur by detecting the proximity of an external object (e.g., a part of a user's body) and performing an antenna-switching operation according to whether or not the proximity occurs.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
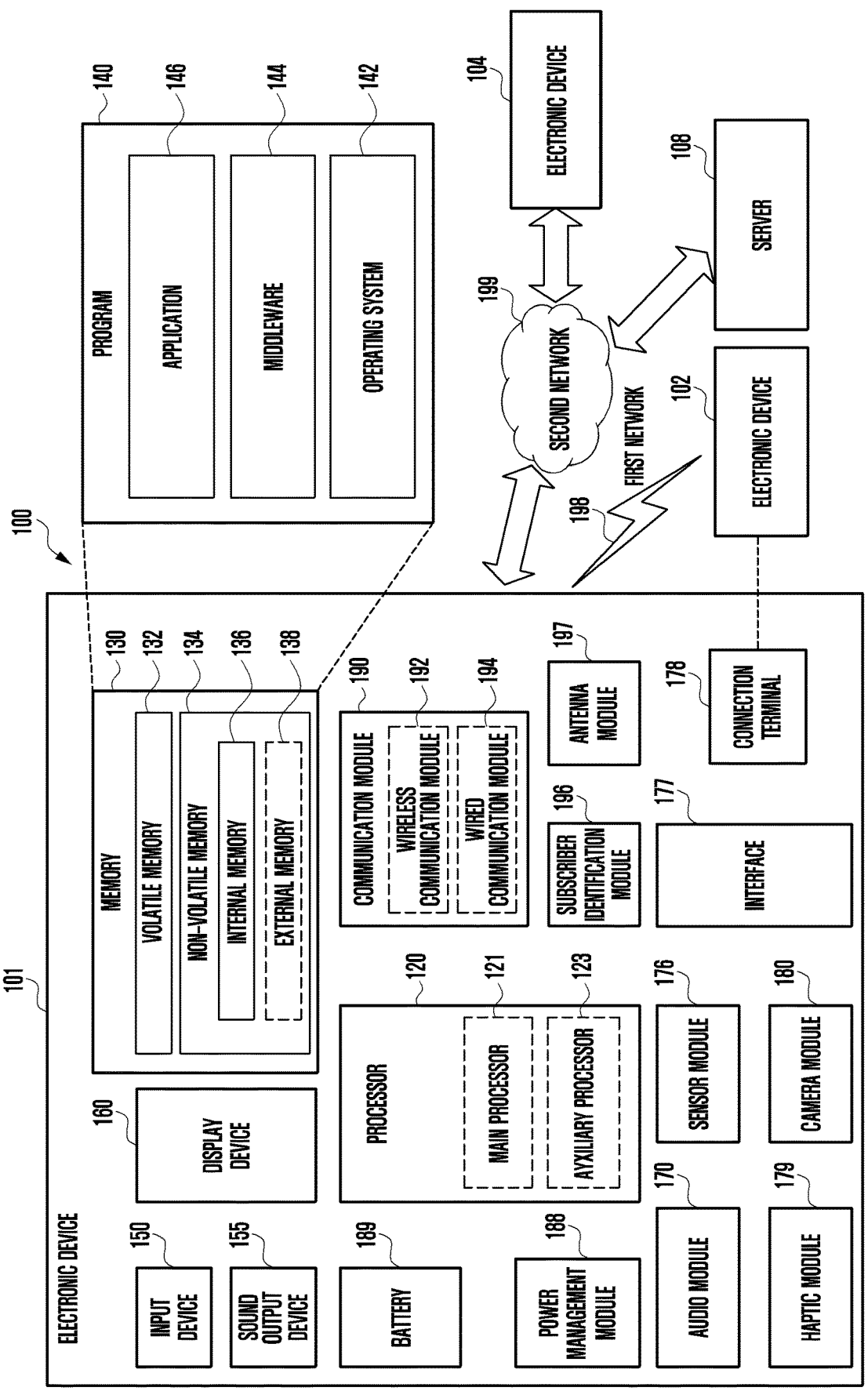
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
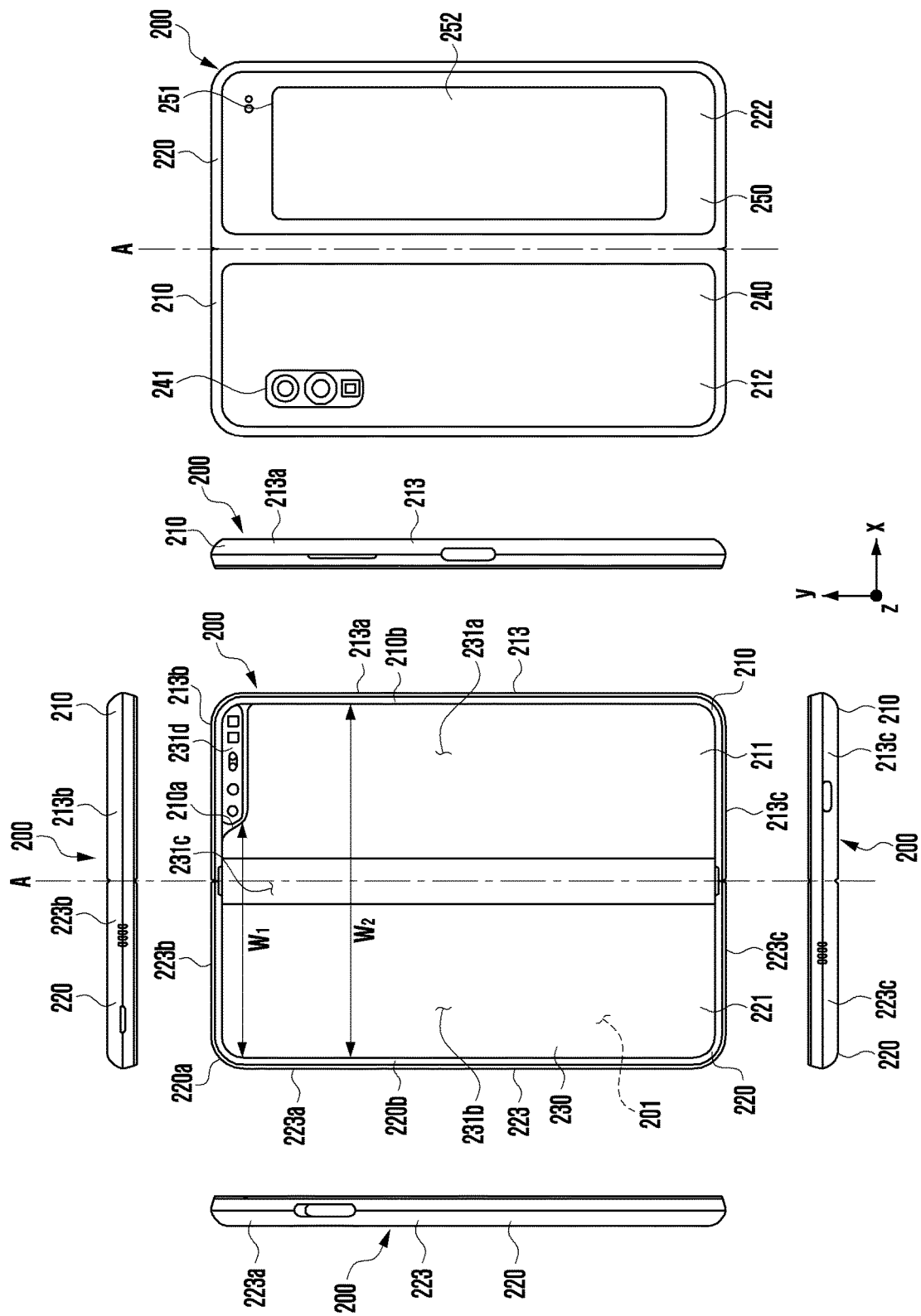
FIG. 2A is a view illustrating an electronic device in an unfolded state according to an embodiment of the disclosure.

FIG. 2A is a diagram illustrating an electronic device in an unfolded state according to an embodiment of the disclosure.

Figure 2B:
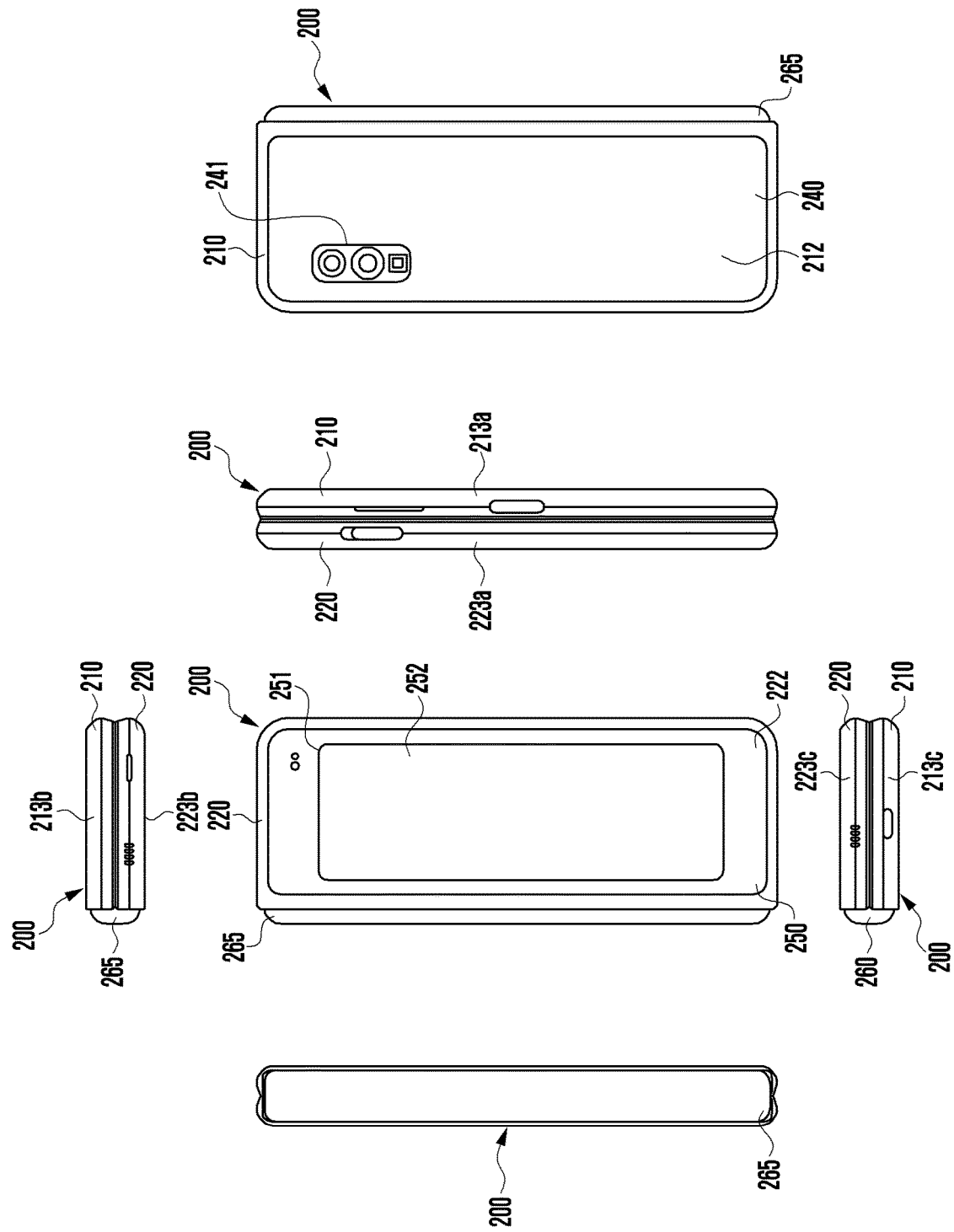
FIG. 2B is a view illustrating the electronic device of FIG. 2A in a folded state according to an embodiment of the disclosure.

FIG. 2B is a diagram illustrating the electronic device shown in FIG. 2A in a folded state according to an embodiment of the disclosure.

An electronic device 200 in FIGS. 2A and 2B may be, at least in part, similar to the electronic device 101 in FIG. 1, or may include other embodiments of the electronic device.

Referring to FIG. 2A, an electronic device 200 may include a pair of housing structures 210 and 220 rotatably coupled to each other through a hinge structure (e.g., a hinge structure 264 in FIG. 3) so as to be folded relative to each other, a hinge cover 265 covering a foldable portion of the pair of housing structures 210 and 220, and a display 230 (e.g., a flexible display or a foldable display) provided in a space formed by the pair of housing structures 210 and 220. In this document, a surface on which the display 230 is provided may be defined as a front surface of the electronic device 200, and a surface opposite the front surface may be defined as a rear surface of the electronic device 200. In addition, the surface surrounding the space between the front surface and the rear surface may be defined as a side surface of the electronic device 200.

In an embodiment, the pair of housing structures 210 and 220 may include a first housing structure 210 including a sensor area 231d, a second housing structure 220, a first rear cover 240, and a second rear cover 250. The pair of housing structures 210 and 220 of the electronic device 200 is not limited to the shape and connection shown in FIGS. 2A and 2B, but may be implemented by combinations and/or connections of other shapes or components. For example, in another embodiment, the first housing structure 210 and the first rear cover 240 may be integrally formed, and the second housing structure 220 and the second rear cover 250 may be integrally formed.

According to an embodiment, the first housing structure 210 and the second housing structure 220 may be provided at both sides with respect to a folding axis (an axis A), and may have shapes that are symmetric overall with respect to the folding axis (the axis A). According to an embodiment, an angle or a distance between the first housing structure 210 and the second housing structure 220 may vary depending on whether the electronic device 200 is in an unfolded state, an folded state, or an intermediate state. According to an embodiment, unlike the second housing structure 220, the first housing structure 210 may further include a sensor area 231d in which various sensors are provided, but may be symmetric with the second housing structure 220 in the area other than the sensor area 231d. In another embodiment, the sensor area 231d may be further provided in or replaced with at least a portion of the second housing structure 220.

In an embodiment, the first housing structure 210 may be connected to a hinge structure (e.g., a hinge structure 264 in FIG. 3), and may have a first surface 211 provided to face the front surface of the electronic device 200 in an unfolded state of the electronic device 200, a second surface 212 directed in the direction opposite the first surface 211, and a first side member 213 surrounding at least a portion of the space between the first surface 211 and the second surface 212. In an embodiment, the first side member 213 may include a first side surface 213a provided in parallel to the folding axis (the axis A), a second side surface 213b extending from one end of the first side surface 213a in the direction perpendicular to the folding axis, the third side surface 213c extending from the opposite end of the first side surface 213a in the direction perpendicular to the folding axis (the axis A).

In an embodiment, the second housing structure 220 may be connected to a hinge structure (e.g., a hinge structure 264 in FIG. 3), and may have a third surface 221 provided to face the front surface of the electronic device 200 in an unfolded state of the electronic device 200, a fourth surface 222 directed in the direction opposite the third surface 221, and a second side member 223 surrounding at least a portion of the space between the third surface 221 and the fourth surface 222. In an embodiment, the second side member 223 may include a fourth side surface 223a provided in parallel to the folding axis (the axis A), a fifth side surface 223b extending from one end of the fourth side surface 223a in the direction perpendicular to the folding axis (the axis A), and a sixth side surface 223c extending from the opposite end of the fourth side surface 223a in the direction perpendicular to the folding axis (the axis A). In an embodiment, the third surface 221 may face the first surface 211 in a folded state.

In an embodiment, the electronic device 200 may include a recess 201 formed to receive a display 230 through structural shape coupling of the first housing structure 210 and the second housing structure 220. The recess 201 may have substantially the same size as the display 230. In an embodiment, the recess 201 may have two or more different widths in the direction perpendicular to the folding axis (the axis A) due to the sensor area 231d. For example, the recess 201 may have a first width (W1) between a first portion 220a parallel to the folding axis (the axis A) of the second housing structure 220 and a first portion 210a formed at the edge of the sensor area 231d of the first housing structure 210 and a second width (W2) between a second portion 220b of the second housing structure 220 and a second portion 210b that is parallel to the folding axis (the axis A) and does not belong to the sensor area 231d in the first housing structure 210. In this case, the second width (W2) may be greater than the first width (W1). For example, the recess 201 may be formed so as to have a first width (W1) from a first portion 210a of the first housing structure 210, which has an asymmetric shape, to a first portion 220a of the second housing structure 220 and a second width (W2) from the second portion 210b of the first housing structure 210, which has a symmetric shape, to the second portion 220b of the second housing structure 220. In an embodiment, the first portion 210a and the second portion 210b of the first housing structure 210 may be formed so as to have different distances from the folding axis (the axis A). The width of the recess 201 is not limited to the illustrated example. In various embodiments, the recess 201 may have two or more different widths due to the shape of the sensor area 231d or the asymmetric shapes of the first housing structure 210 and the second housing structure 220.

In an embodiment, at least a portion of the first housing structure 210 and the second housing structure 220 may be made of a metallic or non-metallic material having a selected intensity of rigidity in order to support the display 230.

In an embodiment, the sensor area 231d may be provided adjacent to a corner of the first housing structure 210 so as to have a predetermined area. However, the arrangement, shape, or size of the sensor area 231d is not limited to the illustrated example. For example, in other embodiments, the sensor area 231d may be provided at another corner of the first housing structure 210 or in any area between the top and bottom corners. In another embodiment, the sensor area 231d may be provided in at least a portion of the second housing structure. In another embodiment, the sensor area 231d may be arranged to extend over the first housing structure 210 and the second housing structure 220. In an embodiment, the electronic device 200 may include components that are arranged to be exposed to the front surface of the electronic device 200 through the sensor area 231d or through one or more openings provided in the sensor area 231d, thereby executing various functions. In various embodiments, the components may include at least one of, for example, a front camera device, a receiver, a proximity sensor, an illuminance sensor, an iris recognition sensor, an ultrasonic sensor, or an indicator.

In an embodiment, the first rear cover 240 may be provided on the second surface 212 of the first housing structure 210, and may have a substantially rectangular periphery. In an embodiment, at least a portion of the periphery may be wrapped by the first housing structure 210. Similarly, the second rear cover 250 may be provided on the fourth surface 222 of the second housing structure 220, and at least a portion of the periphery thereof may be wrapped by the second housing structure 220.

In the illustrated embodiment, the first rear cover 240 and the second rear cover 250 may be substantially symmetric with respect to the folding axis (the axis A). In another embodiment, the first rear cover 240 and the second rear cover 250 may have various shapes different from each other. In another embodiment, the first rear cover 240 may be integrally formed with the first housing structure 210, and the second rear cover 250 may be integrally formed with the second housing structure 220.

In an embodiment, the first rear cover 240, the second rear cover 250, the first housing structure 210, and the second housing structure 220 may be coupled to each other to provide a space to receive various components of the electronic device 200 (e.g., a printed circuit board, an antenna module, a sensor module, or a battery). In an embodiment, one or more components may be provided on the rear surface of the electronic device 200, or may be visually exposed therefrom. For example, one or more components or sensors may be visually exposed through a first rear area 241 of the first rear cover 240. In various embodiments, the sensor may include a proximity sensor, a rear camera device, and/or a flash. In another embodiment, at least a portion of a sub-display 252 may be visually exposed through a second rear area 251 of the second rear cover 250.

The display 230 may be provided in a space formed by the foldable pair of housing structures 210 and 220. For example, the display 230 may be placed in a recess (e.g., the recess 201 in FIG. 2A) formed by the pair of housing structures 210 and 220, and may be arranged so as to substantially occupy most of the front surface of the electronic device 200. Accordingly, the front surface of the electronic device 200 may include a display 230, a portion (e.g., an edge area) of the first housing structure 210 adjacent to the display 230, and a portion (e.g., an edge area) of the second housing structure 220. In an embodiment, the rear surface of the electronic device 200 may include a first rear cover 240, a portion (e.g., an edge area) of the first housing structure 210 adjacent to the first rear cover 240, a second rear cover 250, and a portion (e.g., an edge area) of the second housing structure 220 adjacent to the second rear cover 250.

In an embodiment, the display 230 may refer to a display of which at least a portion may be transformed into a flat or curved surface. In an embodiment, the display 230 may include a folding area 231c, a first area 231a provided at one side of the folding area 231c (e.g., at the right side of the folding area 231c), and a second area 231b provided at the opposite side of the folding area 231c (e.g., at the left side of the folding area 231c). For example, the first area 231a may be provided on the first surface 211 of the first housing structure 210, and the second area 231b may be provided on the third surface 221 of the second housing structure 220. In an embodiment, the division of the display 230 is illustrated as only an example, and the display 230 may be divided into a plurality of areas (e.g., two areas or four or more areas) according to the structure or functions thereof. Although the area of the display 230 may be divided with respect to the folding area 231c or the folding axis (the axis A) extending in parallel to the y-axis in the embodiment shown in FIG. 2A, the display 230 may be divided based on another folding area (e.g., a folding area parallel to the x-axis) or another folding axis (e.g., a folding axis parallel to the x-axis) in another embodiment. Even though the display is physically divided into several areas by the pair of housing structures 210 and 220 and the hinge structure (e.g., the hinge structure 264 in FIG. 3) as described above, the display 230 may substantially display a full screen through the pair of housing structures 210 and 220 and the hinge structure (e.g., the hinge structure 264 in FIG. 3). In an embodiment, the first area 231a and the second area 231b may have a symmetric shape overall with respect to the folding area 231c. However, unlike the second area 231b, the first area 231a may include a notch area (e.g., a notch area 233 in FIG. 3) obtained by cutting an area corresponding to the sensor area 231d, but other portions of the first area 231a, excluding the notch area, may be symmetric with the second area 231b. For example, the first area 231a and the second area 231b may include portions having a symmetric shape and portions having an asymmetric shape.

Figure 3:
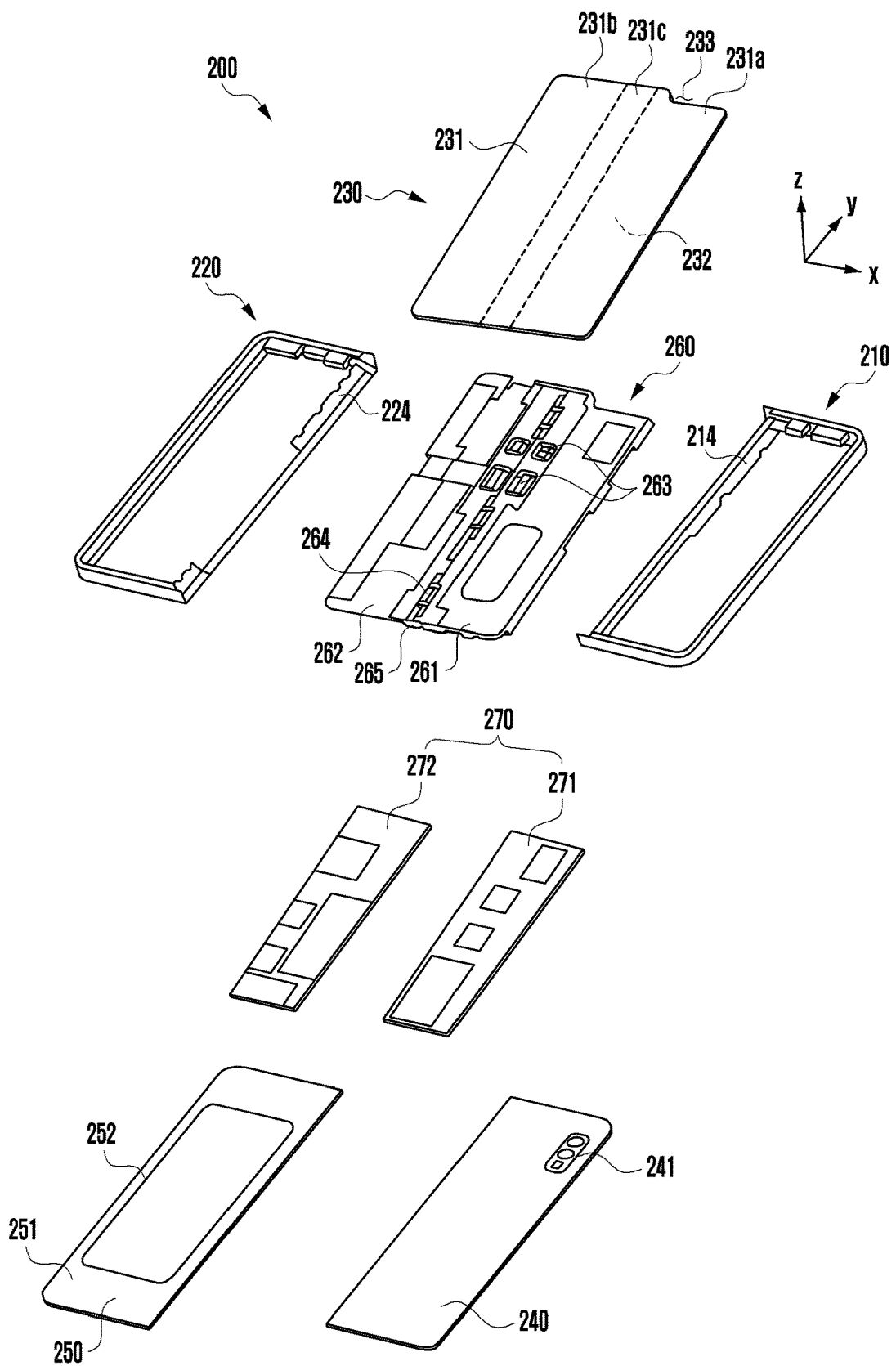
FIG. 3 is an exploded perspective view illustrating the electronic device according to an embodiment of the disclosure.

Referring to FIG. 2B, the hinge cover 265 is provided between the first housing structure 210 and the second housing structure 220 so as to cover internal components (e.g., the hinge structure 264 in FIG. 3). In an embodiment, the hinge cover 265 may be covered or exposed to the outside by a portion of the first housing structure 210 and the second housing structure 220 according to an operating state of the electronic device 200 (an unfolded state or a folded state).

For example, if the electronic device 200 is in an unfolded state as shown in FIG. 2A, the hinge cover 265 may be covered by the first housing structure 210 and the second housing structure 220 so as not to be exposed. For example, if the electronic device 200 is in a folded state (e.g., a completely folded state) as shown in FIG. 2B, the hinge cover 265 may be exposed to the outside between the first housing structure 210 and the second housing structure 220.

For example, if the electronic device 200 is in an intermediate state in which the first housing structure 210 and the second housing structure 220 are folded at a certain angle, a portion of the hinge cover 265 may be exposed to the outside of the electronic device 200 between the first housing structure 210 and the second housing structure 220. In this case, the exposed area may be smaller than that in the fully folded state. In an embodiment, the hinge cover 265 may include a curved surface.

Hereinafter, the operation of the first housing structure 210 and the second housing structure 220 and respective areas of the display 230 according to the operating state of the electronic device 200 (e.g., an unfolded state and a folded state) will be described.

In an embodiment, if the electronic device 200 is in an unfolded state (e.g., the state shown in FIG. 2A), the first housing structure 210 and the second housing structure 220 are at an angle of 180 degrees with each other, and the first area 231a and the second area 231b of the display may be provided to be directed in the same direction. In addition, the folding area 231c may be on the same plane as the first area 231a and the second area 231b.

In an embodiment, if the electronic device 200 is in a folded state (e.g., the state shown in FIG. 2B), the first housing structure 210 and the second housing structure 220 may be arranged so as to face each other. The first area 231a and the second area 231b of the display 230 may face each other at a sharp angle (e.g., 0 degrees to 10 degrees). The folding area 231c may be configured, at least in part, as a curved surface having a predetermined curvature.

In an embodiment, if the electronic device 200 is in an intermediate state, the first housing structure 210 and the second housing structure 220 may be arranged at a certain angle with each other. The first area 231a and the second area 231b of the display 230 may be at an angle greater than the angle in the folded state and smaller than the angle in the unfolded state. The folding area 231c may be configured, at least in part, as a curved surface having a predetermined curvature, and the curvature may be smaller than the angle in the folded state.

FIG. 3 is an exploded perspective view of an electronic device according to an embodiment of the disclosure.

Referring to FIG. 3, in an embodiment, the electronic device 200 may include a display 230, a bracket assembly 260, one or more printed circuit boards 270, a first housing structure 210, a second housing structure 220, a first rear cover 240, and a second rear cover 250. In this document, the display 230 may be referred to as a "display module" or a "display assembly".

The display 230 may include a display panel 231 (e.g., a flexible display panel) and one or more plates 232 or layers on which the display panel 231 is placed. In an embodiment, the plate 232 may be provided between the display panel 231 and the bracket assembly 260. A display panel 231 may be provided in at least a portion of one surface of the plate 232 (e.g., the surface directed in the z-direction in FIG. 3). The plate 232 may be formed in a shape corresponding to the display panel 231. For example, a portion of the plate 232 may be formed in a shape corresponding to the notch area 233 of the display panel 231.

The bracket assembly 260 may include a first bracket 261, a second bracket 262, a hinge structure 264 provided between the first bracket 261 and the second bracket 262, a hinge cover 265 covering the hinge structure 264 so as not to be viewed from the outside, and a wiring member 263 provided across the first bracket 261 and the second bracket 262 {e.g., a flexible printed circuit board (FPCB)}.

In an embodiment, the bracket assembly 260 may be provided between the plate 232 and one or more printed circuit boards 270. For example, the first bracket 261 may be provided between the first area 231a of the display 230 and a first printed circuit board 271. The second bracket 262 may be provided between the second area 231b of the display 230 and a second printed circuit board 272.

In an embodiment, at least a portion of the wiring member 263 and the hinge structure 264 may be provided inside the bracket assembly 260. The wiring member 263 may be arranged in a direction crossing the first bracket 261 and the second bracket 262 (e.g., in the x-axis direction). The wiring member 263 may be arranged in a direction (e.g., the x-axis direction) perpendicular to a folding axis (e.g., the y-axis or the folding axis A in FIG. 1) of the folding area 231c.

One or more printed circuit boards 270 may include a first printed circuit board 271 provided on the side of the first bracket 261 and a second printed circuit board 272 provided on the side of the second bracket 262 as mentioned above. The first printed circuit board 271 and the second printed circuit board 272 may be provided in a space formed by the bracket assembly 260, the first housing structure 210, the second housing structure 220, the first rear cover 240, and the second rear cover 250. The first printed circuit board 271 and the second printed circuit board 272 may have components mounted thereon so as to implement various functions of the electronic device 200.

In an embodiment, the first housing structure 210 and the second housing structure 220 may be assembled so as to be coupled to both sides of the bracket assembly 260 in the state in which the display 230 is coupled to the bracket assembly 260. As described later, the first housing structure 210 and the second housing structure 220 may be coupled to the bracket assembly 260 by sliding on both sides of the bracket assembly 260.

In an embodiment, the first housing structure 210 may include a first rotary support surface 214, and the second housing structure 220 may include a second rotary support surface 224 corresponding to the first rotary support surface 214. The first rotary support surface 214 and the second rotary support surface 224 may include curved surfaces corresponding to curved surfaces provided in the hinge cover 265.

In an embodiment, if the electronic device 200 is in an unfolded state (e.g., the state shown in FIG. 2A), the first rotary support surface 214 and the second rotary support surface 224 may cover the hinge cover 265 so as to prevent the hinge cover 265 of the electronic device 200 from being exposed to the rear surface of the electronic device 200 or so as to minimize the exposure thereof. In an embodiment, if the electronic device 200 is in a folded state (e.g., the state shown in FIG. 2B), the first rotary support surface 214 and the second rotary support surface 224 may rotate along curved surfaces provided in the hinge cover 265 so that the hinge cover 265 may be fully exposed to the rear surface of the electronic device 200.

Figure 4:
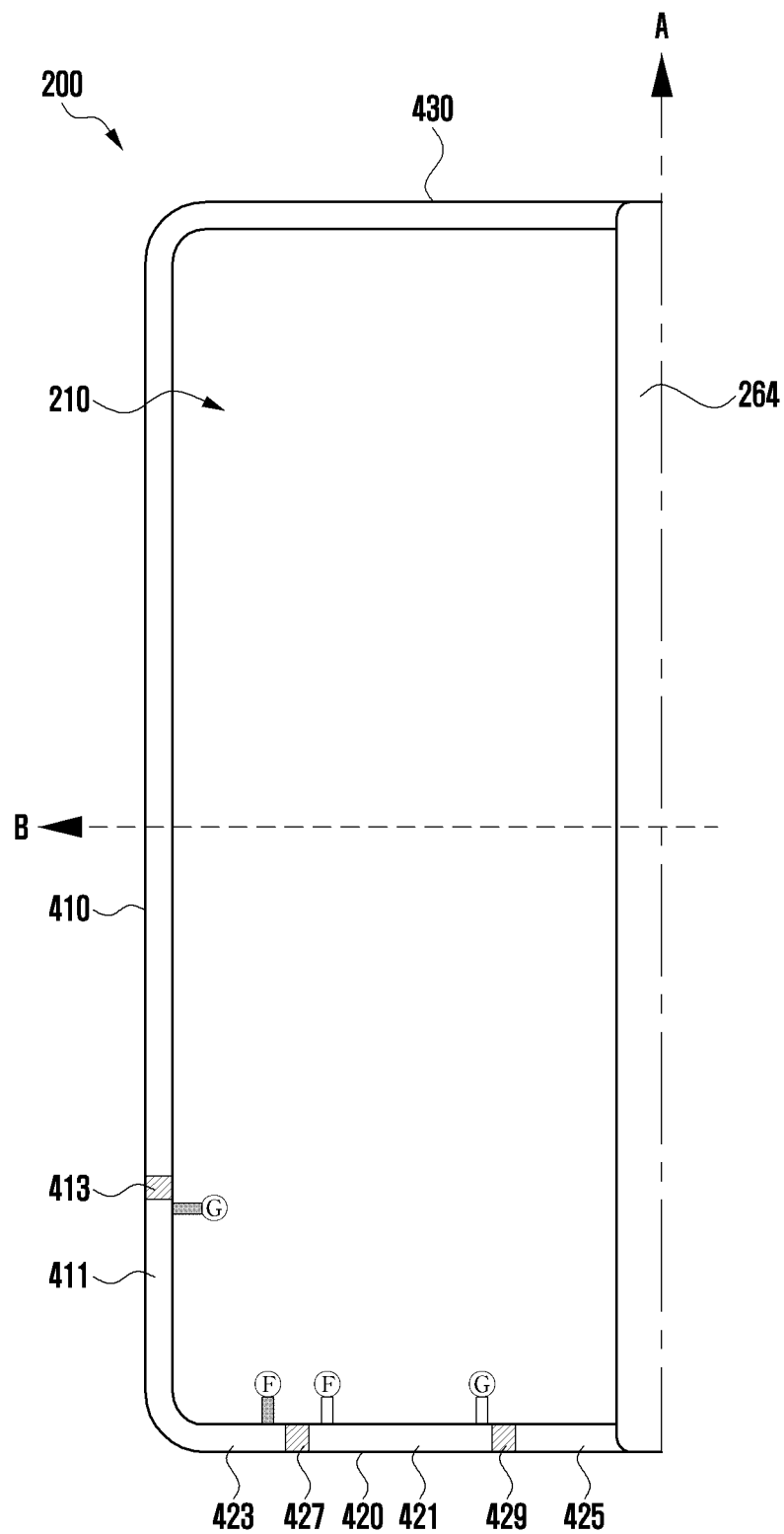
FIG. 4 is a cross-sectional view illustrating an electronic device according to an embodiment of the disclosure.

FIG. 4 is a cross-sectional view illustrating an electronic device according to an embodiment of the disclosure.

Specifically, FIG. 4 is a cross-sectional view of a first housing structure 210 when the electronic device is in a folded state.

Referring to FIG. 4, the electronic device 200 according to various embodiments may include a first housing structure 210 and a second housing structure (not illustrated) (e.g., the second housing structure 220 in FIG. 2A) disposed on opposite sides of a hinge structure 264 forming a folding axis A.

According to various embodiments, the first housing structure 210 may include a first surface connected to the hinge structure 264 and oriented to face a first direction, a second surface oriented to face a second direction opposite to the first surface, and a first side member surrounding a first space between the first surface and the second surface.

According to various embodiments, the second housing structure may include a third surface connected to the hinge structure 264 and oriented to face a third direction, a fourth surface oriented to face a fourth direction opposite to the third direction, and a second side member surrounding a second space between the third surface and the fourth surface. According to various embodiments, the first housing structure 210 and the second housing structure are capable of being folded about the hinge structure 264 so as to overlap each other.

According to various embodiments, the side surface of the first housing structure 210 may be provided with a mechanical item defined as a first side member (or a first side housing), and the side surface of the second housing structure may be provided with a mechanical item defined as a second side member (or a second side housing).

The first side member according to various embodiments may include a first side surface 410 substantially parallel to the folding axis A, a second side surface 420 connected to one side of the first side surface 410 and perpendicular to the folding axis A, and a third side surface 430 connected to the other side of the first side surface 410 and substantially parallel to the second side surface 420. The second side structure (not illustrated) according to various embodiments may include a fourth side surface substantially parallel to the folding axis A, a fifth side surface connected to one side of the fourth side surface and perpendicular to the folding axis, and a sixth side surface connected to the other side of the fourth side surface and substantially parallel to the fifth side surface.

According to various embodiments, the wording "substantially parallel" may mean geometrically parallel alignment, or alignment having an angular deviation of 10 degrees or less.

According to various embodiments, the first side member may include a conductive portion. For example, the first side member may be formed of a metal material, except for a portion of the second side surface 420 and a portion of the third side surface 430.

According to various embodiments, the second side surface 420 may include at least one non-conductive portion disposed between a plurality of conductive portions. For example, the second side surface 420 may include a first conductive portion 421, a second conductive portion 423 disposed on one side of the first conductive portion 421, a third conductive portion 425 disposed on the other side of the first conductive portion 421, a first non-conductive portion 427 disposed between the first conductive portion 421 and the second conductive portion 423, and a second non-conductive portion 429 disposed between the first conductive portion 421 and the third conductive portion 425. The first non-conductive portion 427 and the second non-conductive portion 429 may form a segmented portion.

According to various embodiments, the first side surface 410 may include a fourth conductive portion 411. According to various embodiments, the fourth conductive portion 411 may be used as a radiator (e.g., a first antenna ANT #1) that is connected to the second conductive portion 423 disposed on the second side surface 420 so as to radiate an RF signal output from a communication circuit.

According to various embodiments, the first conductive portion 421 disposed on the second side surface 420 may be used as a radiator (e.g., a second antenna ANT #2) that radiates an RF signal output from the communication circuit.

According to various embodiments, the RF signals output from the communication circuit may include a first RF signal or a second RF signal. The first RF signal according to various embodiments may be a signal related to a low-frequency band, and the second RF signal may be a signal related to a medium-frequency band or a high-frequency band. For example, the first RF signal may have a low-band (~1 GHz) communication frequency, and the second RF signal may have a mid-band (~2.1 GHz), high-band (~2.7 GHz), or ultra-high-band (~3.5 GHz) communication frequency.

According to various embodiments, the second conductive portion 423 and the fourth conductive portion 411 may be connected to each other to form the first antenna ANT #1 for resonating the first RF signal output from the communication circuit, and the first conductive portion 421 may be a second antenna ANT #2 for resonating the second RF signal output from the communication circuit. According to various embodiments, each of the first to fourth conductive portions 421, 423, 425, and 411 is formed of a planner inverted F antenna (PIFA) type antenna, and may be electrically connected to at least one feeding portion and at least one ground formed on a printed circuit board (not illustrated) (e.g., an FPCB).

According to various embodiments, the first side surface 410 may include a third non-conductive portion 413 formed on one side of the fourth conductive portion 411. For example, the third non-conductive portion 413 may be formed on the upper end portion of the fourth conductive portion 411, and the third non-conductive portion 413 may form a segmented portion.

Figure 5A:
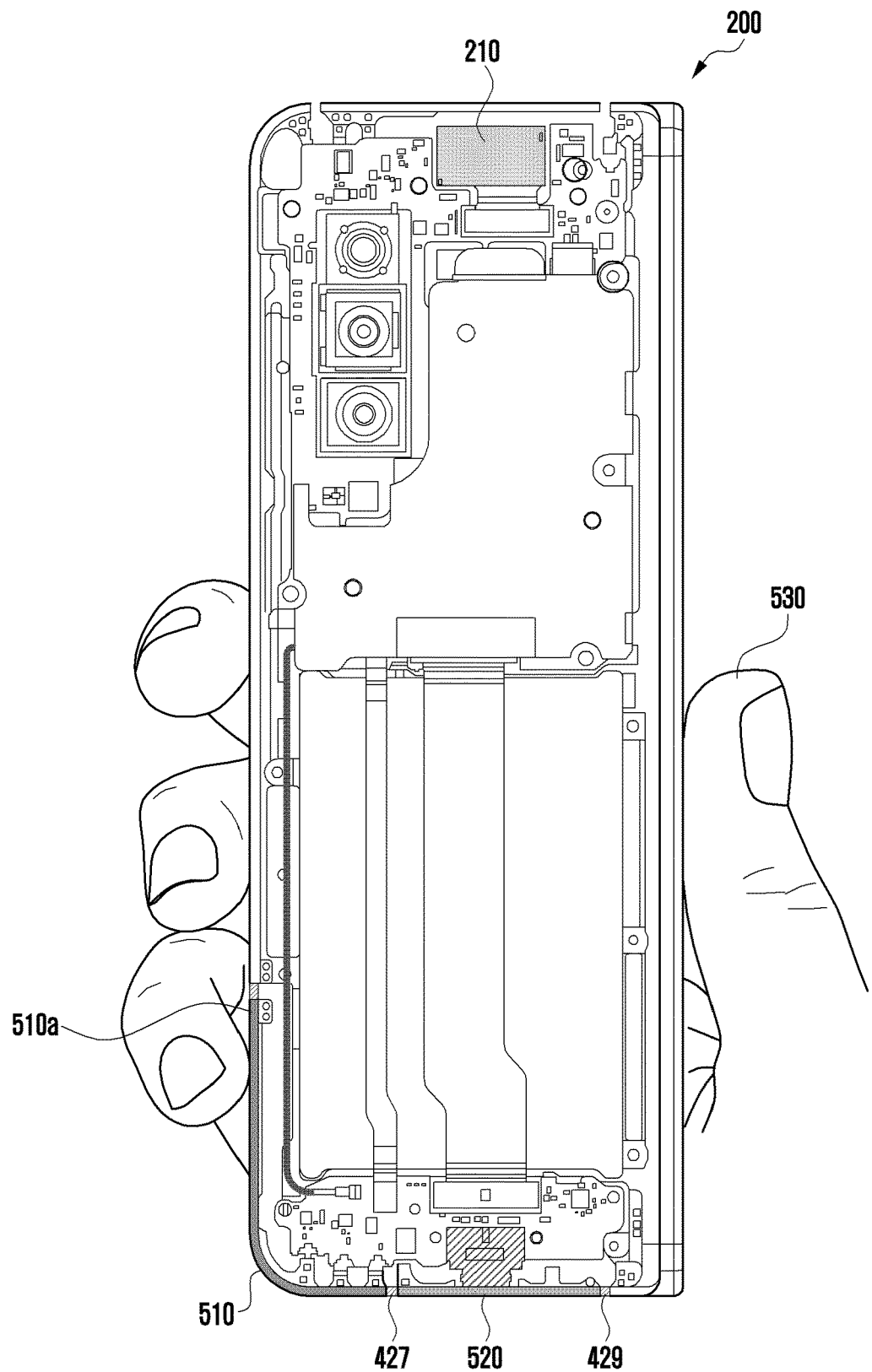
FIG. 5A is a view illustrating a situation in which a death grip may occur in an electronic device according to an embodiment of the disclosure.

FIG. 5A is a view illustrating a situation in which a death grip may occur in an electronic device according to an embodiment of the disclosure.

Figure 5B:
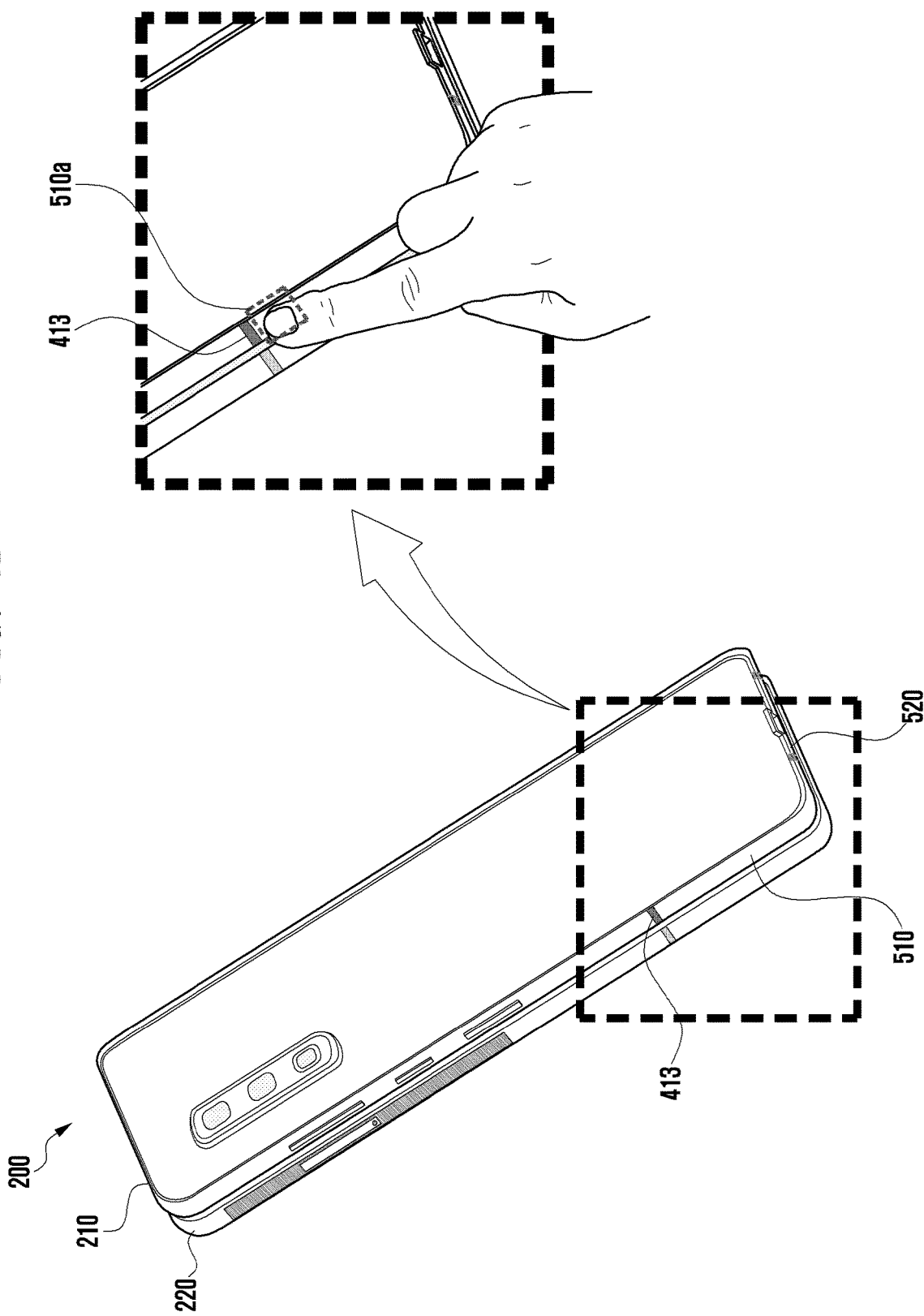
FIG. 5B is a view illustrating a situation in which a death grip may occur in an electronic device according to an embodiment of the disclosure.

FIG. 5B is a view illustrating a situation in which a death grip may occur in an electronic device according to an embodiment of the disclosure.

According to various embodiments, a death grip (or antenna gate) means a phenomenon in which transmission/reception sensitivity of an antenna is degraded due to a change in dielectric constant of an antenna formed of a conductive portion when the user of the electronic device 200 holds (or grips) the conductive portion used as an antenna of the electronic device 200. For example, when a death grip occurs in the first antenna, the communication sensitivity of the first antenna may be degraded. For example, the radiation efficiency of the first antenna may be degraded.

Referring to FIGS. 5A and 5B, for example, when a user's body portion 530 (e.g., a finger) comes into contact with at least a portion of the first antenna 510 while using the electronic device 200 in a folded state, the death grip phenomenon may occur in the first antenna 510. For example, as illustrated in FIG. 5A, when a user holds the electronic device 200 in a folded state and performs a voice call through the first antenna 510, a user's body portion 530 may come into contact with the conductive portions of the first antenna 510 (e.g., the second conductive portion 423 and the fourth conductive portion 411 in FIG. 4) and the communication sensitivity of the first antenna 510 may be degraded.

For example, when a user's body portion 530 comes into contact with the end portion 510a of the first antenna 510 (e.g., the upper end portion of the fourth conductive portion constituting the first antenna), the radiation efficiency of the first antenna 510 may be degraded. For example, as illustrated in FIG. 5B, when the user's body portion comes into contact with at least a portion of a conductive portion of the first antenna 510 (e.g., the upper end portion 510a of the fourth conductive portion), the death grip phenomenon may occur in the first antenna 510.

The electronic device 200 according to various embodiments is capable of sensing a user's grip (or holding) using a grip sensor. The grip sensor may be, for example, a sensor that detects whether or not a user's body portion comes into contact with a specific point of the electronic device 200. For example, according to various embodiments, when a user's grip is not detected (e.g., when a contact of a user's body portion is not detected), a low-frequency band communication signal may control a switch such that a call can be performed through the first antenna. For example, when a user's grip is detected (e.g., when a contact of a user's body portion is detected), the low-frequency band communication signal may also perform antenna switching such that a call can be performed through the second antenna 520. According to various embodiments, the grip sensor may be disposed near the first antenna 510.

According to various embodiments disclosed in this document, in a situation in which a death grip may occur (e.g., a situation in which a user's holding (or grip) is detected), it is possible to prevent the phenomenon in which communication sensitivity is degraded (e.g., the phenomenon in which antenna radiation efficiency is degraded) through antenna switching can be prevented.

The electronic device 200 according to various embodiments is capable of quickly determining whether or not it is a situation in which an antenna performance degradation phenomenon may occur by detecting proximity of an external object using a proximity sensor disposed adjacent to a conductive part used as an antenna.

Figure 5C:
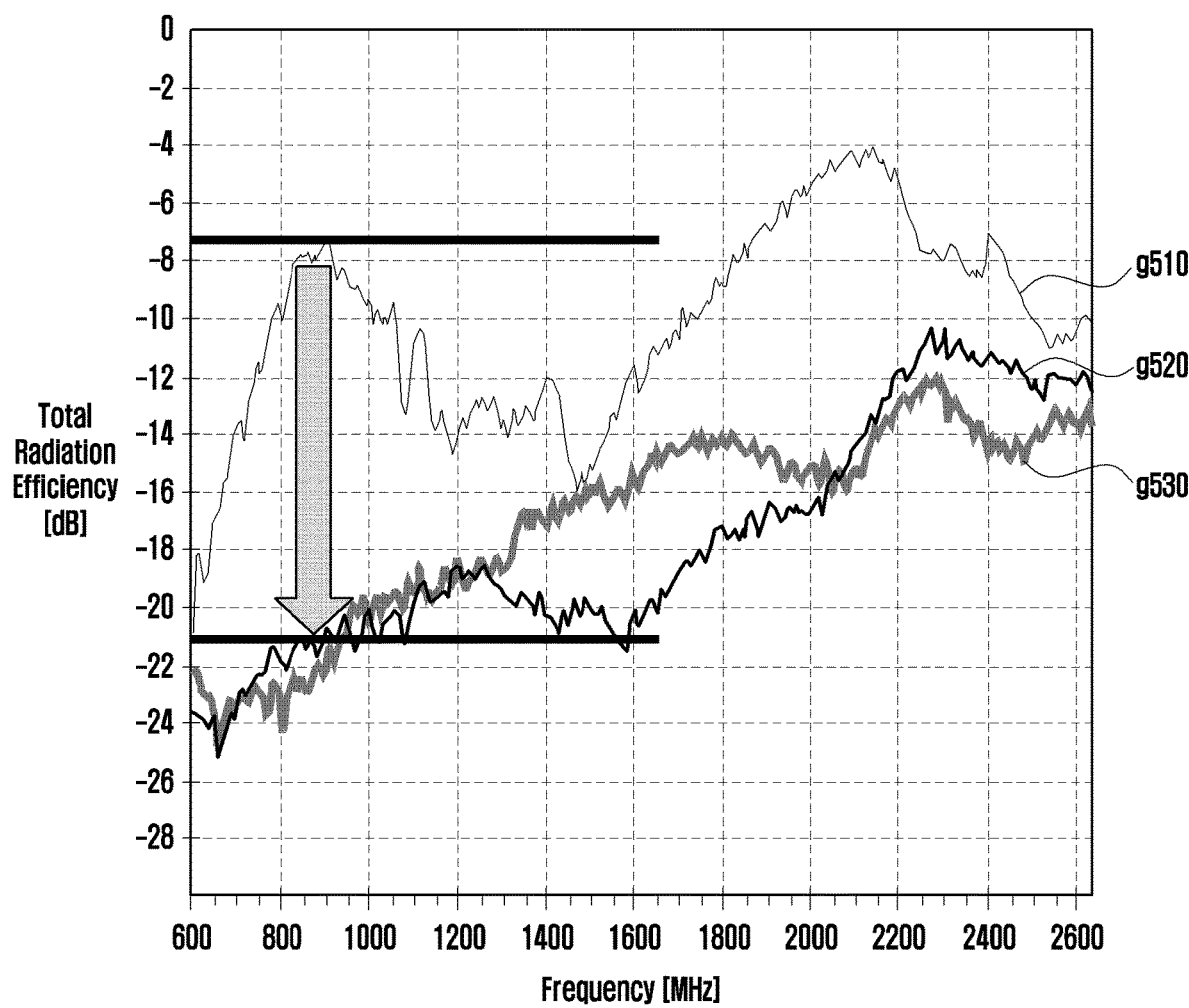
FIG. 5C is a graph showing antenna radiation performance of an electronic device according to whether or not a death grip occurs according to an embodiment of the disclosure.

FIG. 5C is a graph showing antenna radiation performance of an electronic device according to whether a death grip occurs according to an embodiment of the disclosure.

Specifically, FIG. 5C is a graph showing frequency-antenna radiation efficiency according to whether the death grip of the first antenna occurs. The x-axis represents the frequency, and the y-axis represents the total radiation efficiency of the first antenna.

Referring to FIG. 5C, graph g510 is a graph showing the total radiation efficiency of the antenna when no death grip occurs, and graphs g520 and g530 are graphs showing the total radiation efficiency of the antenna when a death grip occurs.

Referring to the radiation efficiency of the antenna in the low-frequency band (1000 MHz or less), it can be seen that the total antenna radiation efficiency through the antenna in the case where a death grip occurs (g520, g530) is significantly reduced compared to that in the case where no death grip occurs (g510).

Figure 6A:
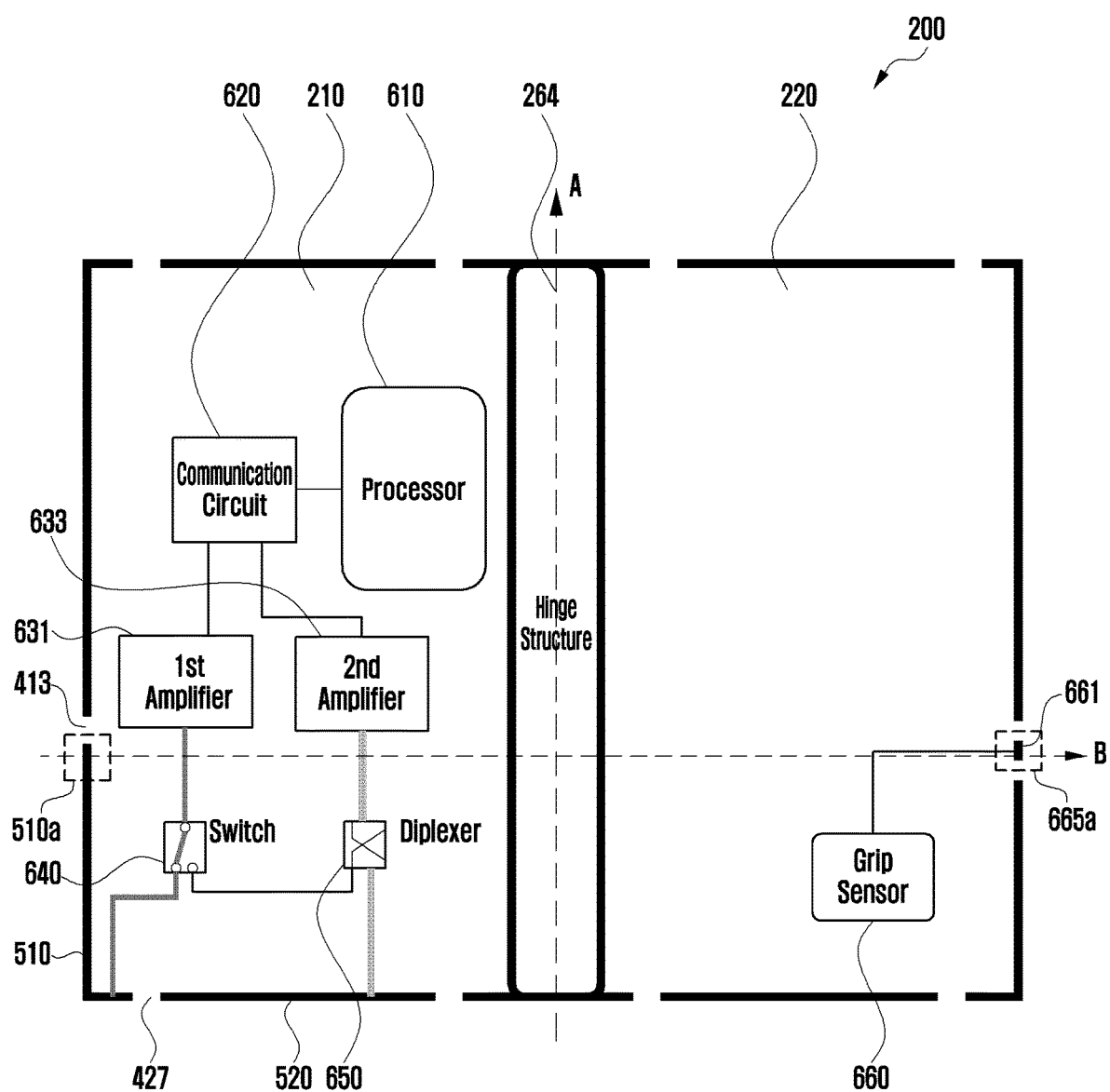
FIG. 6A is a block diagram of an electronic device according to an embodiment of the disclosure.

FIG. 6A is a block diagram of an electronic device according to an embodiment of the disclosure.

Figure 6B:
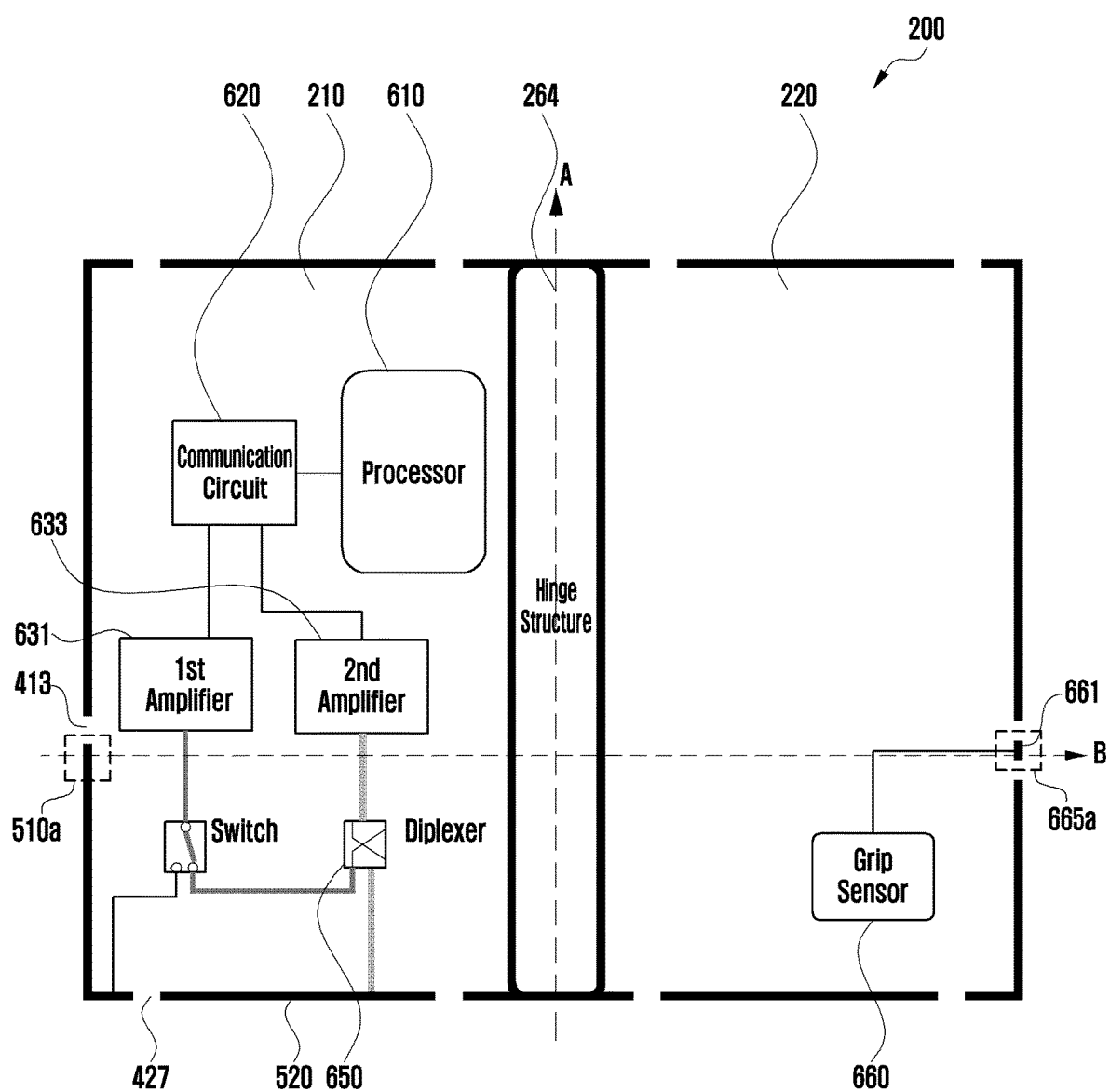
FIG. 6B is a block diagram of the electronic device according to an embodiment of the disclosure.

FIG. 6B is a block diagram of the electronic device according to an embodiment of the disclosure.

Specifically, FIG. 6A is a block diagram of the electronic device 200 when no user's grip is detected, and FIG. 6B is a block diagram of the electronic device 200 when a user's grip is detected. FIGS. 6A and 6B are block diagrams of the electronic device 200 when viewed from the rear surface (the first and third surfaces) of the electronic device 200 in an unfolded state.

Referring to FIG. 6A, the electronic device 200 according to various embodiments may include a processor 610 (e.g., the processor 120 in FIG. 1), a communication circuit 620 (e.g., the communication module 190 in FIG. 1), a first amplifier 631, a second amplifier 633, a switch 640, a diplexer 650, or a grip sensor 660. Even if some of the components illustrated in FIG. 6A are omitted or substituted, there will be no problem in implementing the various embodiments disclosed herein.

According to various embodiments, the processor 610 is a component capable of performing an operation or data processing related to control and/or communication of each component of the electronic device 200, and may include at least some of the components and/or functions of the processor 120 of FIG. 1. The processor 610 may be operatively connected to, for example, components of the electronic device 200. The processor 610 may load a command or data received from another component of the electronic device 200 into a memory (not illustrate), may process commands or data stored in the memory, and may store result data. The processor 610 may include, for example, a communication modem. The communication modem, for example, have a configuration in which a modulator and a demodulator are combined, and may be configured to modulate/demodulate a communication signal.

The communication circuit 620 according to various embodiments may establish a communication channel with an external electronic device, and may transmit/receive various data to/from the external device. According to various embodiments, the communication circuit 620 may include a cellular communication module and may be configured to be connected to a cellular network (e.g., 3rd generation (3G), long term evolution (LTE), 5th generation (5G), wireless broadband (Wibro), or worldwide interoperability for microwave access (Wimax)). According to various embodiments, the communication circuit 620 may include a short-range communication module so as to transmit/receive data with an external electronic device using short-range communication (e.g., Wi-Fi, Bluetooth, Bluetooth Low Energy (BLE), or ultra-wide band (UWB)), but is not limited thereto. The communication circuit 620 may output, for example, RF signals having various frequency bands. The communication circuit 620 may include, for example, a transceiver. The transceiver may be, for example, a component capable of transmitting/receiving data.

The first amplifier 631 and the second amplifier 633 according to various embodiments may be configured to increase energy of an input signal and output a large amount of energy to an output side. The first amplifier 631 and the second amplifier 633 may be power amplifiers (PA) that increase the power of a signal. The first amplifier 631 and the second amplifier 633 according to various embodiments may amplify and output a communication signal received from the communication circuit 620.

According to various embodiments, the first amplifier 631 may be a low-frequency power amplifier that processes a low-frequency band communication signal. The first amplifier 631 may include, for example, a low-band power amplifier module including diplexer (LB PAMID) including a low-band power amplifier and a diplexer. The second amplifier 633 may be a high-frequency power amplifier that processes a communication signal related to a medium-frequency band or a high-frequency band. The second amplifier 633 may include, for example, a mid/high-band power amplifier module including diplexer (PAMID) including a high-frequency power amplifier and a diplexer.

The switch 640 according to various embodiments may be connected to the first amplifier 631, the first antenna 510, or the diplexer 650. The switch 640 may be configured to electrically connect the first amplifier 631 to the first antenna 510, or to electrically connect the first amplifier 631 to the second antenna 520 via the diplexer 650. The switch 640 may be, for example, a three-way switch 640 of single pole double throw (SPDT). Of course, the switch 640 according to various embodiments may be implemented as single pole 3 through (SP3T) or double pole double through (DPDT). Under the control of the processor 610, the switch 640 according to various embodiments may connect the first amplifier 631 and the first antenna 510 to each other, or may connect the first amplifier 631 and the diplexer 650 to each other.

According to various embodiments, components forming an electrical path for transmitting and receiving signals in a first frequency band (e.g., a low-frequency band) may be defined by a first transmission/reception circuit. The first transmission/reception circuit may include, for example, a first amplifier 631 and a switch 640. The first transmission/reception circuit may electrically connect the first amplifier 631 and the first antenna 510 through the switch 640.

The diplexer 650 according to various embodiments may be a combiner for sharing two different frequency signals. The diplexer 650 may be, for example, a combiner for radiating radio waves without interference by commonly using a single antenna for communication signals of two different frequency bands. The diplexer 650 may have, for example, a structure in which a low-pass filter (LPF) and a high-pass filter (HPF) are combined.

According to various embodiments, the diplexer 650 may be a branch filter element used in one channel or line so as to prevent channel interference having different frequencies and to combine or separate/divide two signals.

According to various embodiments, by using the diplexer 650, the second antenna 520 is capable of transmitting and receiving not only a high-frequency band communication signal but also a low-frequency band communication signal.

According to various embodiments, components forming an electrical path for transmitting and receiving signals in a second frequency band (e.g., a medium-frequency or high-frequency band) may be defined by a second transmission/reception circuit. The second transmission/reception circuit may include, for example, a second amplifier 633 and a diplexer 650. The second transmission/reception circuit may electrically connect the second amplifier 633 and the second antenna 520 via the diplexer 650. According to various embodiments, the diplexer 650 of the second transmission/reception circuit may be electrically connected to the first amplifier 631 via the switch 640. In this case, a low-frequency band signal input/output through the first amplifier 631 may be transmitted and received through the second antenna 520 using the diplexer 650.

Under the control of the processor 610, the switch 640 according to various embodiments may electrically connect the first amplifier 631 to the first antenna 510, or may connect the first amplifier 631 to the second antenna 520 via the diplexer 650.

The first antenna 510 according to various embodiments may have a structure in which the fourth conductive portion 411 of the first side surface 410 of the first housing structure 210 and the second conductive portion 423 of the second side surface 420 are connected to each other. According to various embodiments, a low-frequency band communication signal output through the first amplifier 631 may be radiated through the first antenna 510.

The second antenna 520 according to various embodiments may be the first conductive portion 421 of the second side surface 420 of the first housing structure 210. According to various embodiments, the processor 610 may radiate a medium-frequency or high-frequency band communication signal output through the second amplifier 633 through the second antenna 520.

The grip sensor 660 according to various embodiments may be a sensor that detects whether or not a user grips (or holds) the electronic device. The processor 610 may determine whether or not a user's grip is present by measuring, for example, a change in capacitance. For example, in the case where the user's hand and the grip sensor 660 are in contact with each other when the user grips the electronic device 200 by hand, the capacitance value measured through the grip sensor 660 may change. For example, when the amount of change in capacitance measured through the grip sensor 660 exceeds a preset threshold value, the processor 610 may determine that a user's grip (or holding) is detected. The grip sensor 660 according to various embodiments may include an electrode 661 for detecting a change in capacitance, and the electrode 661 may be exposed to the outside through a portion of the housing of the electronic device 200.

The grip sensor 660 according to various embodiments may be installed at a position close to one end of the first antenna 510 of the first housing, for example, when the electronic device 200 is in the folded state. For example, as illustrated in FIG. 6A, the electrode 661 of the grip sensor 660 may be exposed to the outside through a portion of the fourth side surface of the second side housing of the second housing, which is substantially parallel to the folding axis. The electrode 661 of the grip sensor 660 may be installed in the fourth side surface at a position corresponding to an end portion of the first antenna 510 (e.g., the upper end of the fourth conductive part of the first antenna 510 or a portion that is connected to the ground of the first antenna 510). For example, the electrode 661 of the grip sensor 660 may be installed at a position symmetrical to the end portion of the first antenna 510 of the first housing with respect to the folding axis. In this case, when the electronic device 200 is in the folded state, the end portion of the first antenna 510 and the electrode 661 of the grip sensor 660 may be located adjacent to each other. According to various embodiments, the wording "substantially parallel" may mean geometrically parallel alignment, or alignment having an angular deviation of 10 degrees or less.

For example, in the case where the electrode 661 of the grip sensor 660 is installed in the fourth side surface of the second housing structure at a position 665a that is symmetrical to the end portion 510a of the first antenna 510 with respect to the folding axis A, when a user's grip is detected through the grip sensor 660 in the state in which the electronic device 200 is folded, the processor 610 may determine that it is a situation where a death grip may occur in the first antenna 510.

The processor 610 according to various embodiments may detect whether a grip is generated through the grip sensor 660. For example, the processor 610 may detect whether a grip is generated by a user's body portion (e.g., the user's hand) through the grip sensor 660.

The processor 610 according to various embodiments may control the switch 640 based on whether a grip is generated.

When no grip is detected through the grip sensor 660, the processor 610 according to various embodiments may control the switch 640 such that the first amplifier 631 and the first antenna 510 are electrically connected to each other, as illustrated in FIG. 6A. When no grip is detected through the grip sensor 660, the first amplifier 631 may be electrically connected to the first antenna 510, and the second amplifier 633 may be connected to the second antenna 520. In this case, a low-frequency band communication signal output through the communication circuit 620 may be radiated through the first antenna 510 via the first amplifier 631. In this case, a high-frequency band communication signal output through the communication circuit 620 may be radiated through the second antenna 520 via the second amplifier 633. Even when the electronic device 200 receives a communication signal from the outside, a communication signal may be received through the same path.

Referring to FIG. 6B, when a grip is detected through the grip sensor 660, the processor 610 according to various embodiments may control the switch 640 such that the first amplifier 631 and the diplexer 650 are electrically connected to each other. In this case, a low-frequency signal output through the first amplifier 631 using the diplexer 650 may also be radiated using the second antenna 520. In this case, a low-frequency band communication signal output through the communication circuit 620 may be radiated through the second antenna 520 via the first amplifier 631. In this case, a high-frequency band communication signal output through the communication circuit 620 may be radiated through the second antenna 520 via the second amplifier 633. In this case, by using the function of the diplexer 650, a low-frequency band communication signal and a high-frequency band communication signal can be processed together without interference through one antenna, that is, the second antennas 520.

According to various embodiments, the processor 610 may detect the folded state of the electronic device 200 (e.g., the electronic device 101 in FIG. 1), and when a grip is detected through the grip sensor 660 in the state in which the electronic device is folded, the processor may control the switch 640 such that the first amplifier 631 and the diplexer 650 are electrically connected to each other.

According to various embodiments, the processor 610 may detect the folded state of the electronic device 200 (e.g., the electronic device 101 in FIG. 1), and when a grip is detected through the grip sensor 660 in the state in which the electronic device is unfolded, the processor 610 may ignore the grip detection.

Figure 6C:
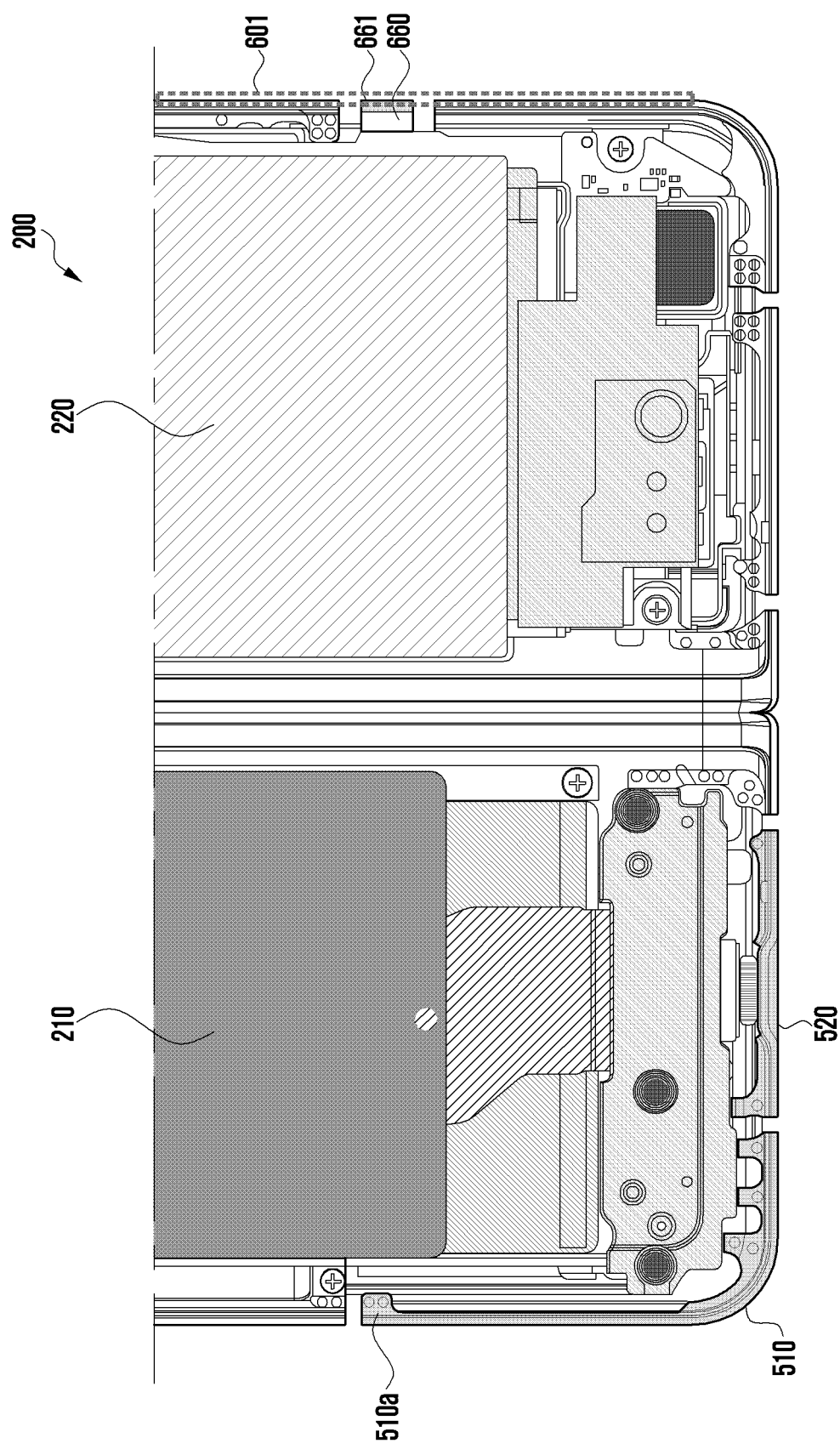
FIG. 6C is a cross-sectional view of an electronic device according to an embodiment of the disclosure.

FIG. 6C is a cross-sectional view illustrating the electronic device according to an embodiment of the disclosure.

Specifically, FIG. 6C is a cross-sectional view of the electronic device 200 in the case where the grip sensor 660 is installed in a portion of the fourth side surface 601 of the second housing structure 220 as illustrated in FIGS. 6A and 6B.

Referring to FIG. 6C, according to various embodiments, for example, the electrode 661 of the grip sensor 660 may be exposed to the outside through a portion of the fourth side surface 601 of the second side housing of the second housing structure 220, which is substantially parallel to the folding axis A. For example, the electrode 661 of the grip sensor 660 may be installed at a position symmetrical to the end portion 510a of the first antenna 510 of the first housing structure 210 with respect to the folding axis A. In this case, when the electronic device 200 is in the folded state, an end of the first antenna 510 and the electrode 661 of the grip sensor 660 may be located adjacent to each other. In this case, when the electronic device 200 is in the folded state, the grip sensor 660 may be close to the end portion 510*a* of the first antenna 510 of the first housing structure 210.

For example, in the case where the electrode 661 of the grip sensor 660 is installed in the fourth side surface 601 of the second housing structure 220 at a position that is symmetrical to the end portion 510*a* of the first antenna 510 with respect to the folding axis A, when a user's grip is detected through the grip sensor 660 in the state in which the electronic device 200 is folded, the processor 610 may determine that it is a situation where a death grip may occur in the first antenna 510.

Figure 7A:
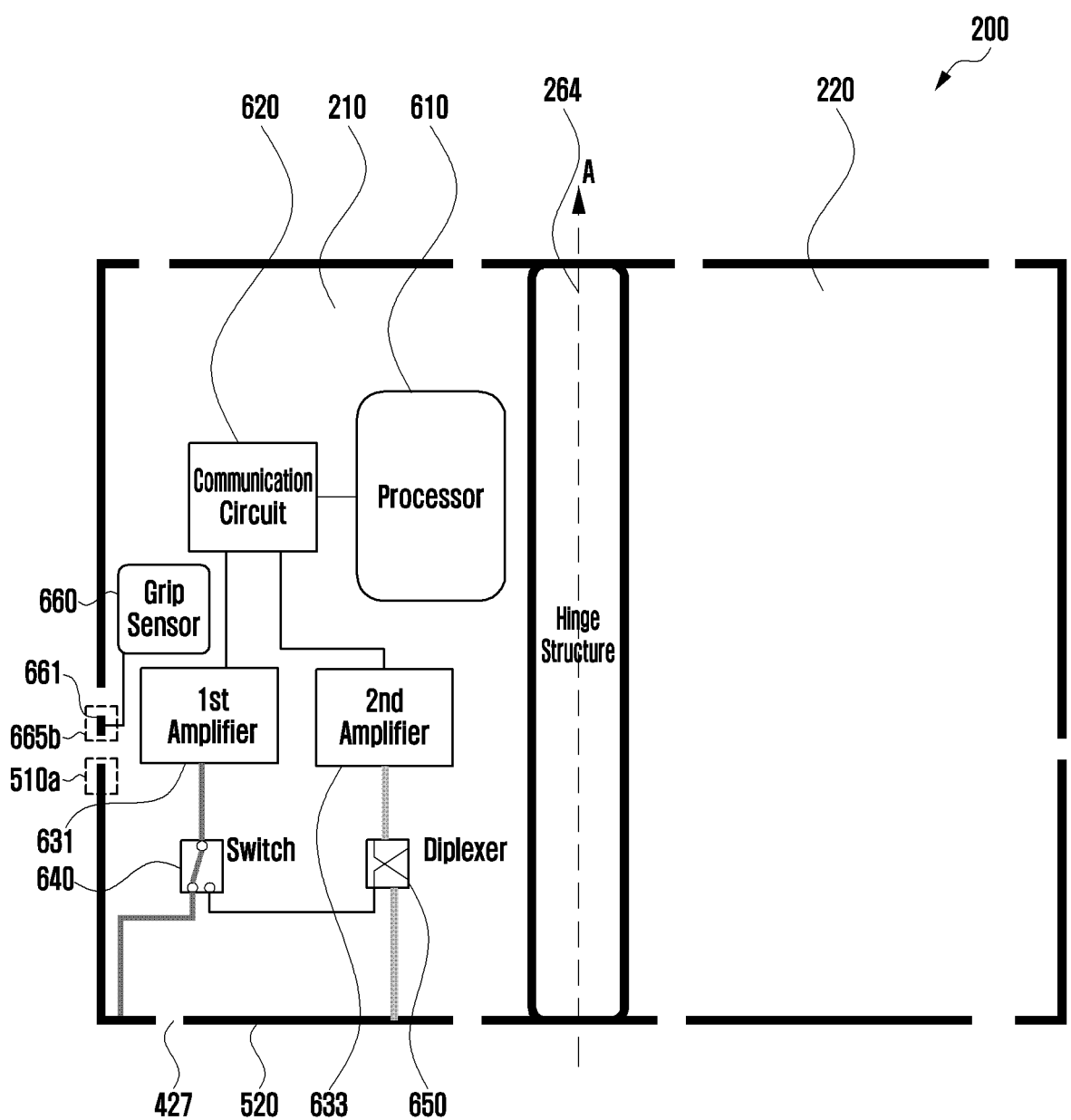
FIG. 7A is a block diagram of an electronic device according to an embodiment of the disclosure.

FIG. 7A is a block diagram of an electronic device according to an embodiment of the disclosure.

Figure 7B:
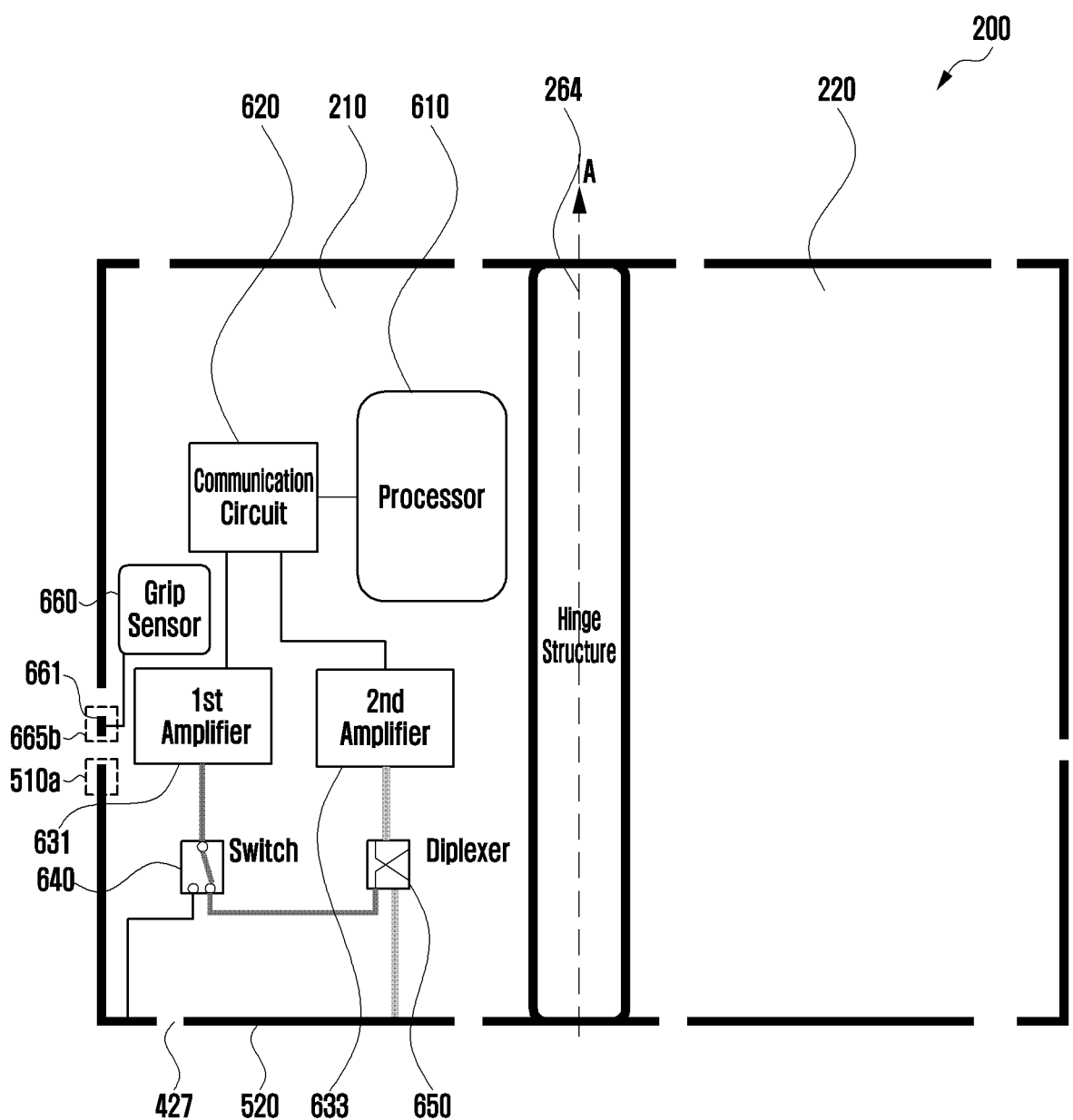
FIG. 7B is a block diagram of the electronic device according to an embodiment of the disclosure.

FIG. 7B is a block diagram of the electronic device according to an embodiment of the disclosure.

Specifically, FIG. 7A is a block diagram of the electronic device 200 when no user's grip is detected, and FIG. 7B is a block diagram of the electronic device 200 when a user's grip is detected. A description overlapping the description made above with reference to FIGS. 6A and 6B will be omitted.

Referring to FIG. 7A, the grip sensor 660 according to various embodiments may be located in the first housing structure 210. For example, the grip sensor 660 according to various embodiments may be installed adjacent to an end of the first antenna 510 of the first housing structure 210 (e.g., the end portion 510*a* of the first antenna 510 or the upper end of the fourth conductive portion 411).

For example, the electrode 661 of the grip sensor may be installed at a position 665*b* adjacent to the third non-conductive portion 413 disposed adjacent to an end portion 510*a* of the first antenna 510. For example, the electrode 661 of the grip sensor 660 may be disposed at a position 665*b* adjacent to the upper end of the third non-conductive portion 413.

For example, in the case where the electrode 661 of the grip sensor 660 is installed in the first side surface 410 of the first housing structure 210 at the position 665*b* that is adjacent to the end portion 510*a* of the first antenna 510, the processor 610 may determine that it is a situation where a death grip may occur in the first antenna 510 when a user's grip is detected through the grip sensor 660 in the state in which the electronic device 200 is folded.

When no grip is detected through the grip sensor 660, the processor 610 according to various embodiments may control the switch 640 such that the first amplifier 631 and the first antenna 510 are electrically connected to each other, as illustrated in FIG. 7A. When no grip is detected through the grip sensor 660, the first amplifier 631 may be electrically connected to the first antenna 510, and the second amplifier 633 may be connected to the second antenna 520. In this case, a low-frequency band communication signal output through the communication circuit 620 may be radiated through the first antenna 510 via the first amplifier 631. In this case, a high-frequency band communication signal output through the communication circuit 620 may be radiated through the second antenna 520 via the second amplifier 633.

Referring to FIG. 7B, when a grip is detected through the grip sensor 660, the processor 610 according to various embodiments may control the switch 640 such that the first amplifier 631 and the diplexer 650 are electrically connected to each other. In this case, a low-frequency signal output through the first amplifier 631 using the diplexer 650 may also be radiated using the second antenna 520. In this case, a low-frequency band communication signal output through the communication circuit 620 may be radiated through the second antenna 520 via the first amplifier 631. In this case, a high-frequency band communication signal output through the communication circuit 620 may be radiated through the second antenna 520 via the second amplifier 633.

Figure 7C:
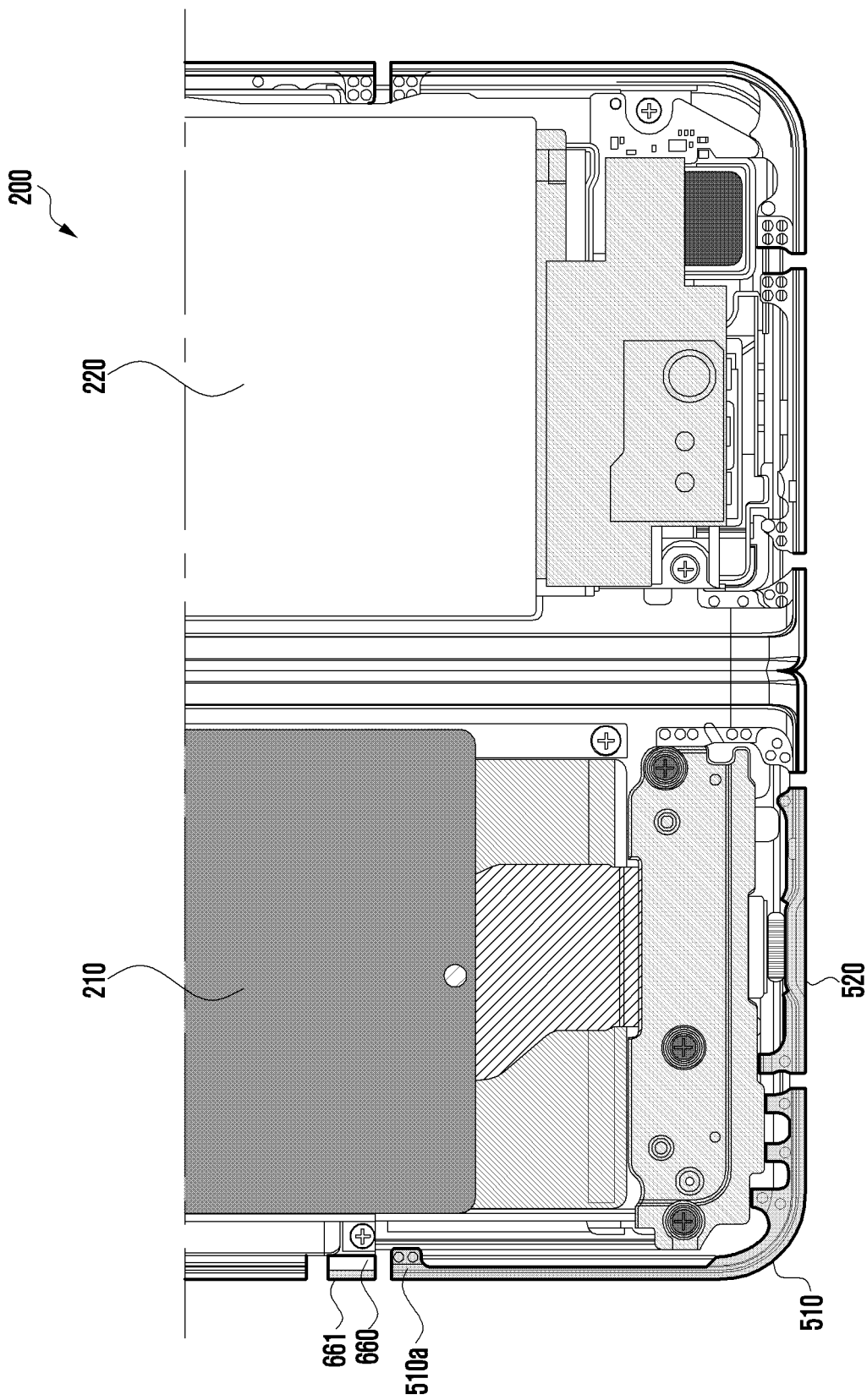
FIG. 7C is a cross-sectional view illustrating an electronic device according to an embodiment of the disclosure.

FIG. 7C is a cross-sectional view of the electronic device 200 according to an embodiment of the disclosure.

Specifically, FIG. 7C is a cross-sectional view of the electronic device 200 in the case where the grip sensor 660 is installed in a portion of the first side surface 410 of the first housing structure 210 as illustrated in FIGS. 7A and 7B.

Referring to FIG. 7C, the grip sensor 660 may be located in a portion of the first side member of the first housing structure 210. For example, the grip sensor 660 according to various embodiments may be installed adjacent to an end (the end portion 510*a*) of the first antenna 510 of the first housing structure 210 (e.g., the upper end of the first antenna 510 or the upper end of the fourth conductive portion 411).

For example, the electrode 661 of the grip sensor 660 may be installed at a position 665*b* adjacent to the third non-conductive portion 413 disposed adjacent to the end portion 510*a* of the first antenna 510. For example, the electrode 661 of the grip sensor 660 may be installed at the upper end of the third non-conductive portion 413.

For example, in the case where the electrode 661 of the grip sensor 660 is installed in the first side surface 410 of the first housing structure 210 at a position that is adjacent to the end portion 510*a* of the first antenna 510, the processor 610 may determine that it is a situation where a death grip may occur in the first antenna 510 when a user's grip is detected through the grip sensor 660 in the state in which the electronic device 200 is folded.

Figure 8A:
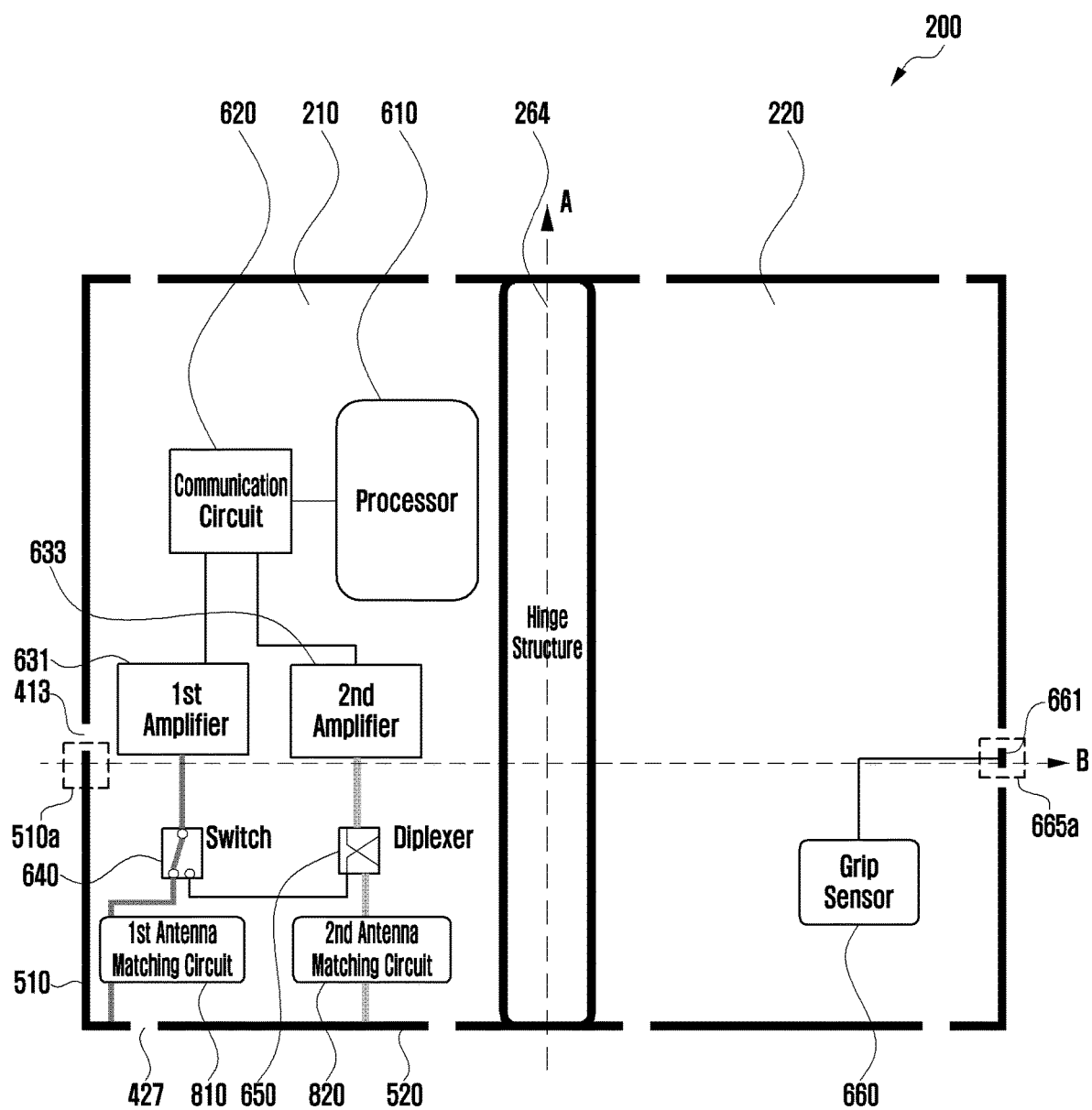
FIG. 8A is a block diagram of an electronic device according to an embodiment of the disclosure.

FIG. 8A is a block diagram of an electronic device according to an embodiment of the disclosure.

Figure 8B:
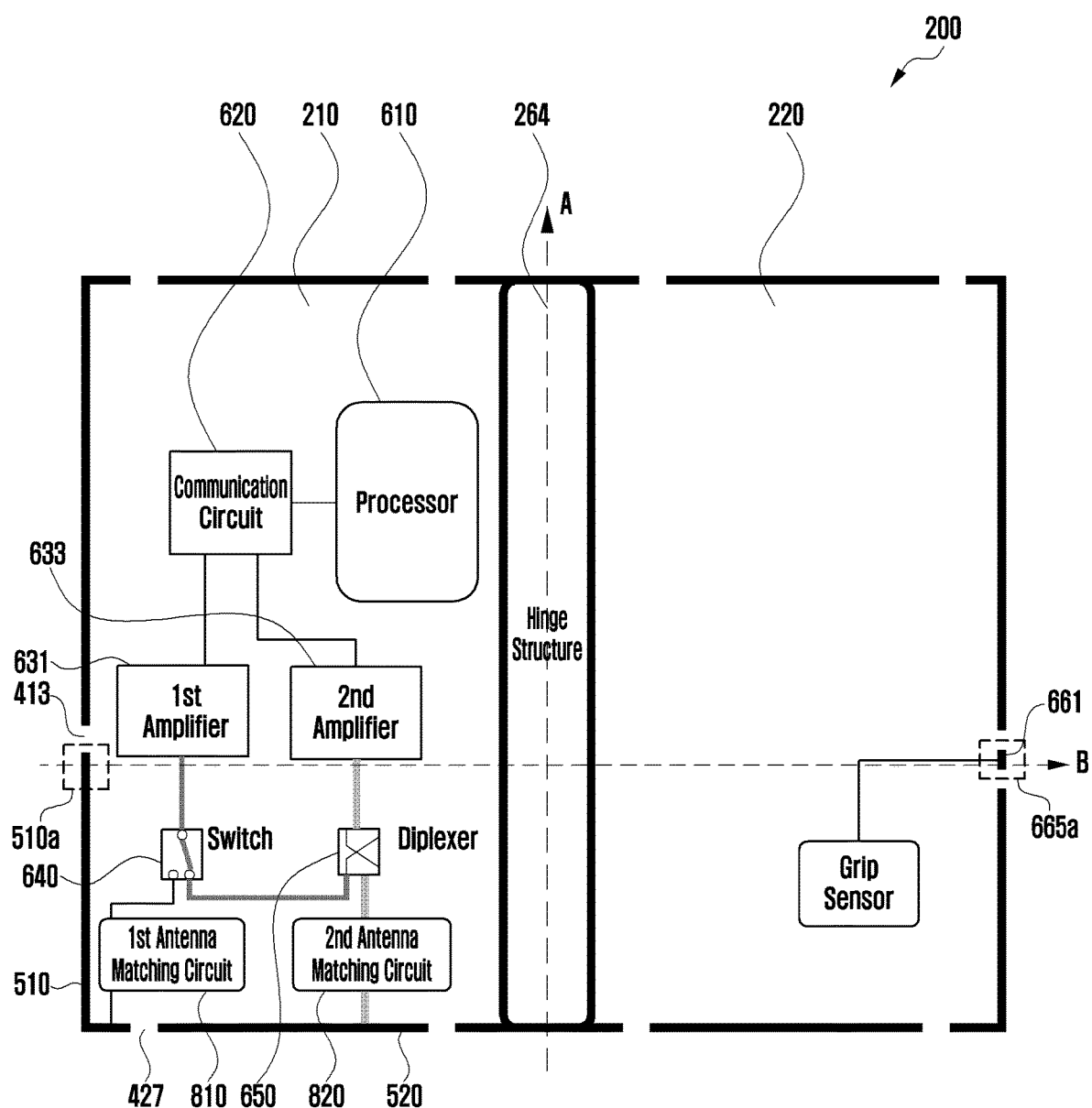
FIG. 8B is a block diagram of the electronic device according to an embodiment of the disclosure.

FIG. 8B is a block diagram of the electronic device according to an embodiment of the disclosure.

FIGS. 8A and 8B are block diagrams in which a switch 640 matching circuit is added to the embodiment illustrated in FIGS. 6A and 6B. A description overlapping the description made above with reference to FIGS. 6A and 6B will be omitted.

Antenna matching circuits 810 and 820 according to various embodiments may be matching circuits for minimizing reflection caused due to an impedance difference by correcting an impedance difference between an antenna and an amplifier through impedance matching.

A first antenna matching circuit 810 according to various embodiments is a matching circuit for impedance matching between the first amplifier 631 and the first antenna 510, and a second antenna matching circuit 820 is a matching circuit for impedance matching between the second amplifier 633 and the second antenna 520.

When a matching circuit is added, reflection caused due to an impedance difference is minimized so that radiation performance of an antenna can be improved.

Referring to FIG. 8A, when no grip is detected through the grip sensor 660, the processor 610 according to various embodiments may control the switch 640 such that the first amplifier 631 and the first antenna 510 are electrically connected to each other. When no grip is detected through the grip sensor 660, the first amplifier 631 may be electrically connected to the first antenna 510, and the second amplifier 633 may be connected to the second antenna 520. In this case, a low-frequency band communication signal output through the communication circuit 620 may be radiated through the first antenna 510 via the first amplifier 631 and the first antenna matching circuit 810. In this case, a high-frequency band communication signal output through the communication circuit 620 may be radiated through the second antenna 520 via the second amplifier 633 and the second antenna matching circuit 820.

Referring to FIG. 8B, when a grip is detected through the grip sensor 660, the processor 610 according to various embodiments may control the switch 640 such that the first amplifier 631 and the diplexer 650 are electrically connected to each other. In this case, a low-frequency signal output through the first amplifier 631 using the diplexer 650 may also be radiated using the second antenna 520. In this case, a low-frequency band communication signal output through the communication circuit 620 may be radiated through the second antenna 520 via the first amplifier 631 and the second antenna matching circuit 820. In this case, a high-frequency band communication signal output through the communication circuit 620 may be radiated through the second antenna 520 via the second amplifier 633 and the second antenna matching circuit 820.

Figure 9A:
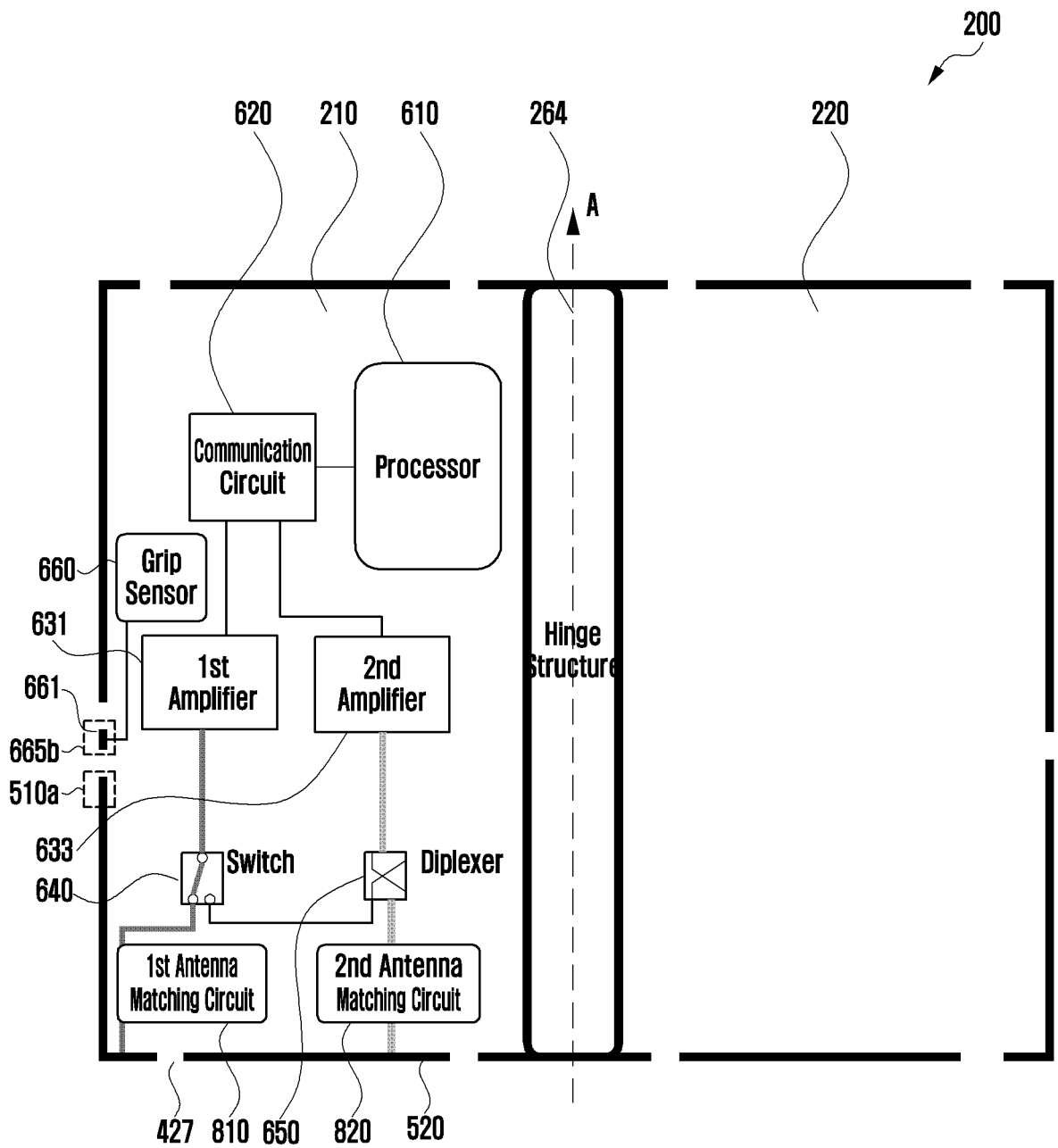
FIG. 9A is a block diagram of an electronic device according to an embodiment of the disclosure.

FIG. 9A is a block diagram of an electronic device according to an embodiment of the disclosure.

Figure 9B:
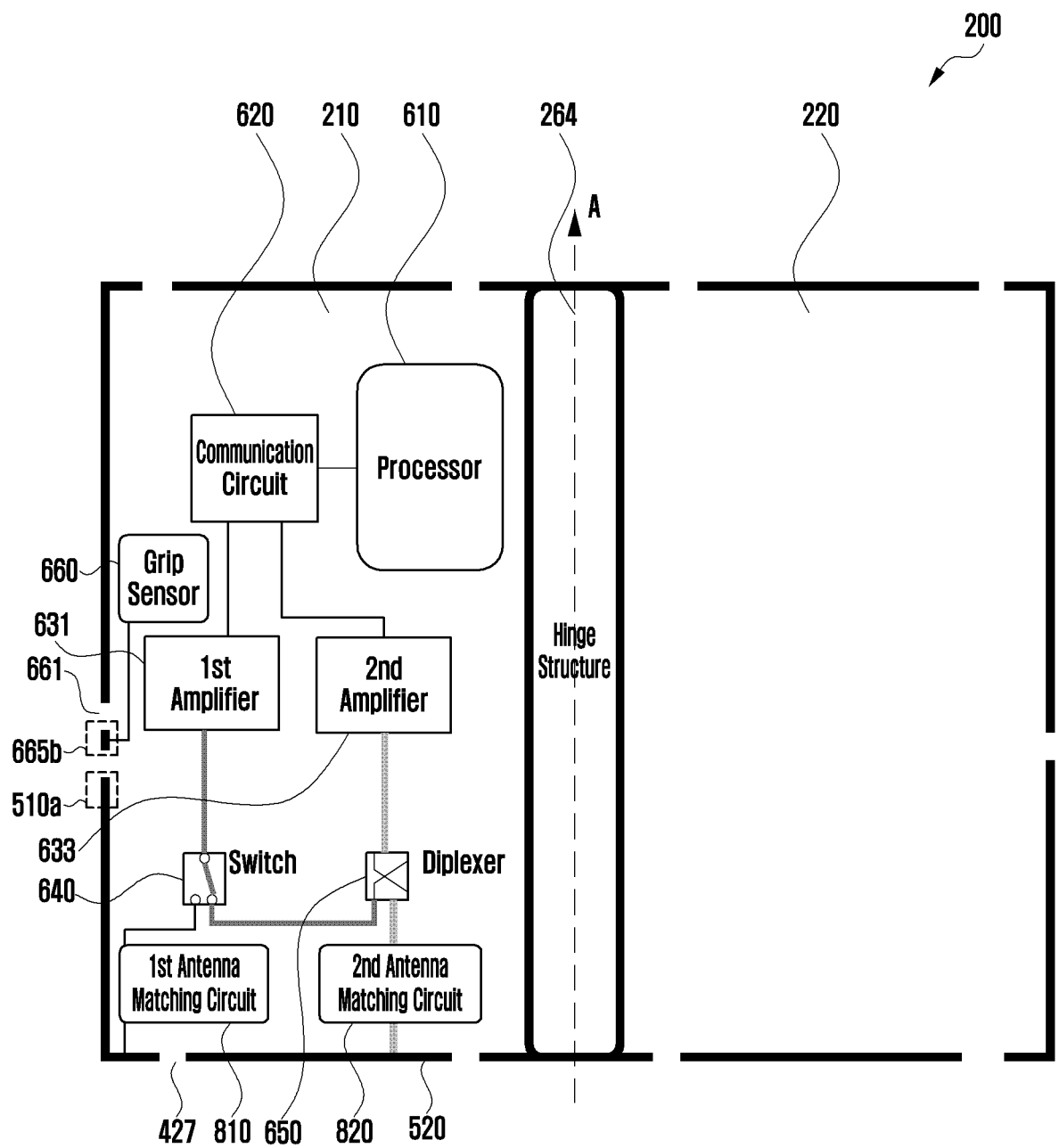
FIG. 9B is a block diagram of the electronic device according to an embodiment of the disclosure.

FIG. 9B is a block diagram of the electronic device according to an embodiment of the disclosure.

FIGS. 9A and 9B are block diagrams in which an antenna matching circuit is added to the embodiment illustrated in FIGS. 7A and 7B. A description overlapping the descriptions made above will be omitted.

Referring to FIG. 9A, when no grip is detected through the grip sensor 660, the processor 610 according to various embodiments may control the switch 640 such that the first amplifier 631 and the first antenna 510 are electrically connected to each other. When no grip is detected through the grip sensor 660, the first amplifier 631 may be electrically connected to the first antenna 510, and the second amplifier 633 may be connected to the second antenna 520. In this case, a low-frequency band communication signal output through the communication circuit 620 may be radiated through the first antenna 510 via the first amplifier 631 and the first antenna matching circuit 810. In this case, a high-frequency band communication signal output through the communication circuit 620 may be radiated through the second antenna 520 via the second amplifier 633 and the second antenna matching circuit 820.

Referring to FIG. 9B, when a grip is detected through the grip sensor 660, the processor 610 according to various embodiments may control the switch 640 such that the first amplifier 631 and the diplexer 650 are electrically connected to each other. In this case, a low-frequency signal output through the first amplifier 631 using the diplexer 650 may also be radiated using the second antenna 520. In this case, a low-frequency band communication signal output through the communication circuit 620 may be radiated through the second antenna 520 via the first amplifier 631 and the second antenna matching circuit 820. In this case, a high-frequency band communication signal output through the communication circuit 620 may be radiated through the second antenna 520 via the second amplifier 633 and the second antenna matching circuit 820.

Figure 10:
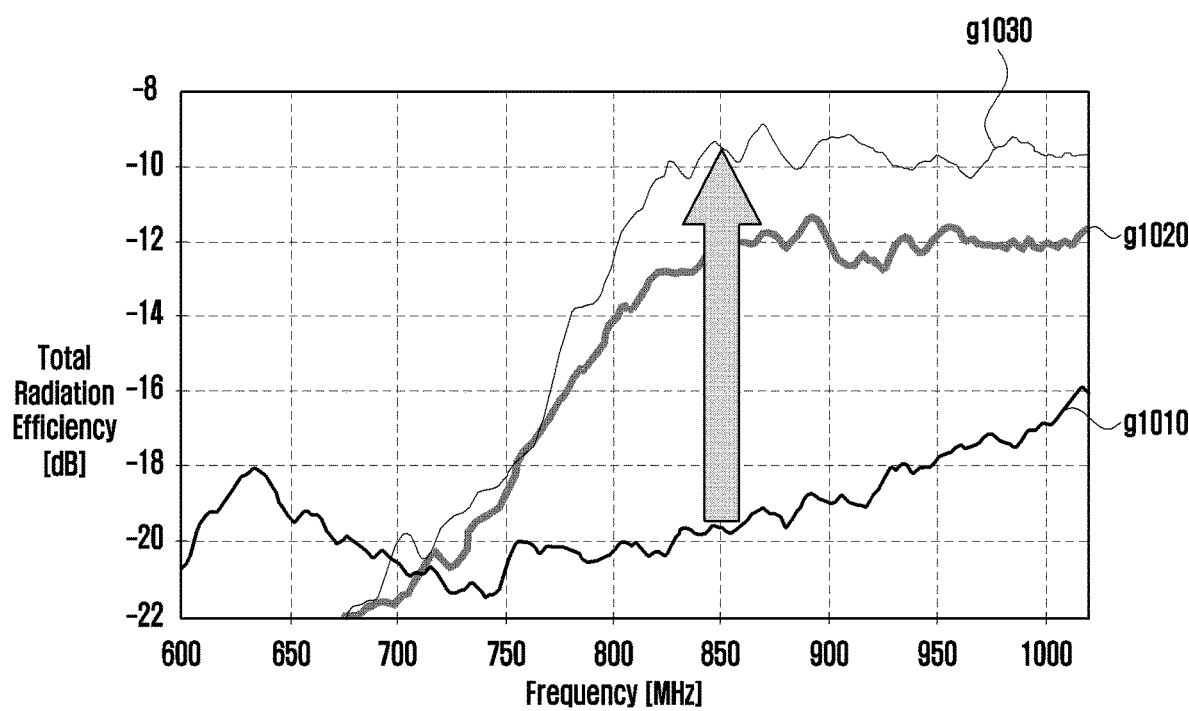
FIG. 10 is a graph showing antenna radiation efficiency with respect to whether or not antenna switching is performed according to an embodiment of the disclosure.

FIG. 10 is a graph showing antenna radiation efficiency with respect to whether or not antenna switching is performed according to an embodiment of the disclosure.

The x-axis represents the frequency, and the y-axis represents the total radiation efficiency of an antenna. Specifically, graphs g1010, g1020, and g1030 of FIG. 10 are graphs showing the total antenna radiation efficiency measured according to whether or not antenna switching was performed when a death grip occurred in the first antenna 510.

Referring to FIG. 10, graph g1010 is a graph showing the total antenna radiation efficiency when a communication signal was radiated using the first antenna 510 in which a death grip occurred without antenna switching.

Graph g1020 is a graph showing the total antenna radiation efficiency when a communication signal was radiated through the second antenna 520 by performing antenna switching when a death grip occurred in the first antenna 510.

Graph g1030 is a graph showing the total antenna radiation efficiency when a communication signal was radiated through the second antenna 520, antenna switching was performed, and impedance matching was additionally performed through a matching circuit, in the case where a death grip occurred in the first antenna 510.

Referring to the total antenna radiation efficiency in the low-frequency band (1000 MHz or less), it can be seen that the antenna radiation efficiency is high in the case where a communication signal was radiated through the second antenna 520 (g1020 and g1030) compared to the case where a communication signal was radiated through the first antenna 510 in which the death grip was generated (g1010).

According to various embodiments, it can be seen that the total antenna radiation in the case where a low-frequency band communication signal was radiated through the second antenna 520 that performed impedance matching through an antenna matching circuit (g1030) is higher than that in the case where a low-frequency band communication signal was radiated through the second antenna 520 without impedance matching. When impedance matching is performed by adding an impedance matching circuit, it is possible to minimize a communication sensitivity degradation phenomenon due to reflection caused by an impedance difference.

Figure 11:
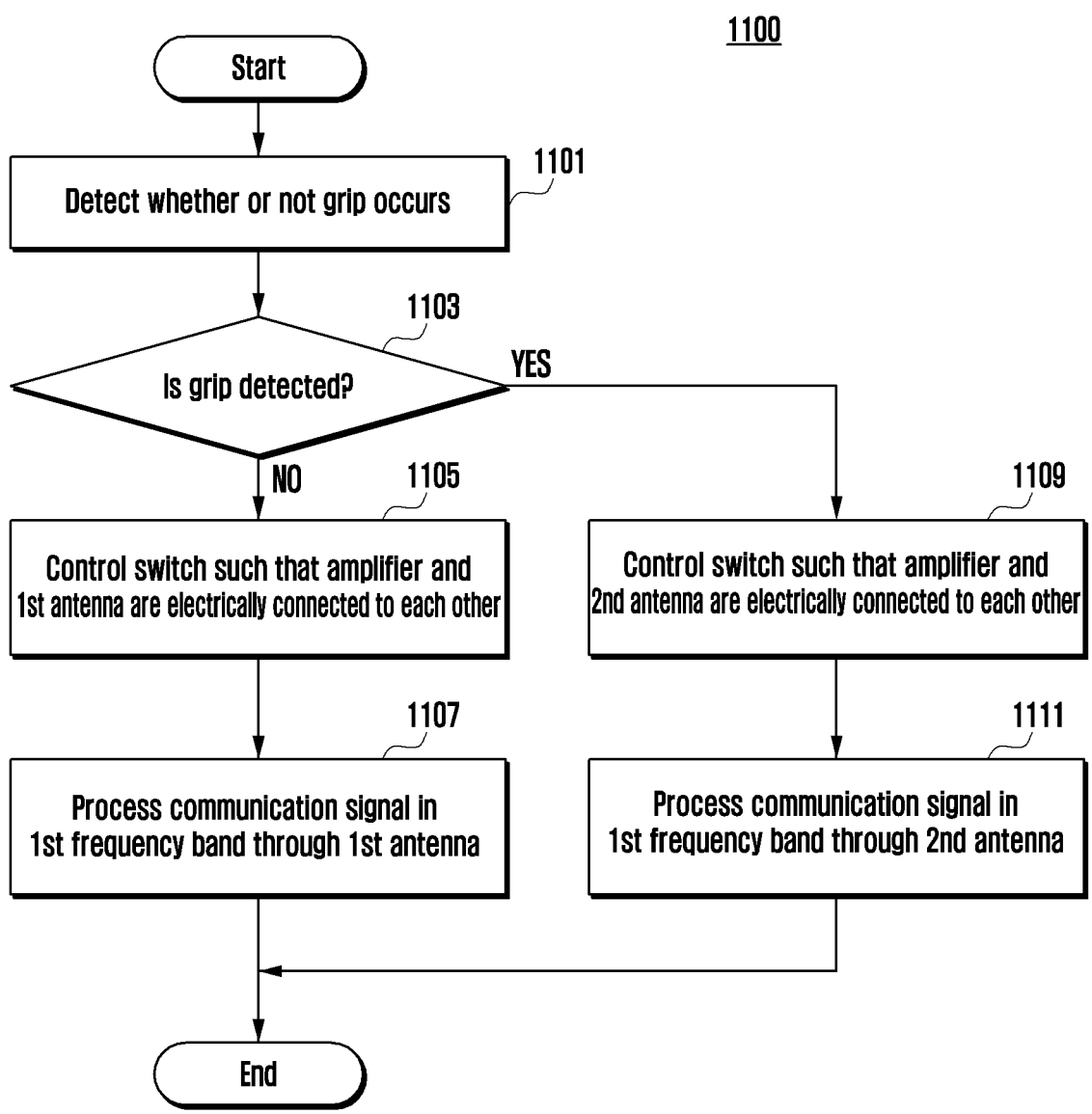
FIG. 11 is a flowchart of operations of the electronic device according to an embodiment of the disclosure.

FIG. 11 is a flowchart of operations of the electronic device according to an embodiment of the disclosure.

Referring to the operation flowchart 1100, the processor 610 according to various embodiments may detect whether a grip is generated through the grip sensor 660 in operation 1101.

According to various embodiments, when a grip performed by a user's body portion (e.g., a user's hand) is not detected in operation 1103, the processor 610 may control the switch 640 such that an amplifier configured to process a signal in a first frequency band (e.g., a low-frequency band) (e.g., the first amplifier 631) and the first antenna 510 are electrically connected to each other in operation 1105. The processor 610 according to various embodiments may process a communication signal in the first frequency band through the first antenna 510 in operation 1107. The processor 610 may radiate, for example, a low-frequency band communication signal through the first antenna 510.

According to various embodiments, when a grip performed by a user's body portion is detected in operation 1109, the processor 610 may control the switch 640 such that an amplifier configured to process a signal in the first frequency band (e.g., the first amplifier 631) and the second antenna 520 are electrically connected to each other. The processor 610 may control the switch 640 such that the amplifier (e.g., the first amplifier 631) and the second antenna 520 are electrically connected via, for example, the diplexer 650. The processor 610 according to various embodiments may process a communication signal in the first frequency band through the second antenna 520 in operation 1111. The processor 610 may radiate, for example, a low-frequency band communication signal through the second antenna 520 using the diplexer 650.

Figure 12A:
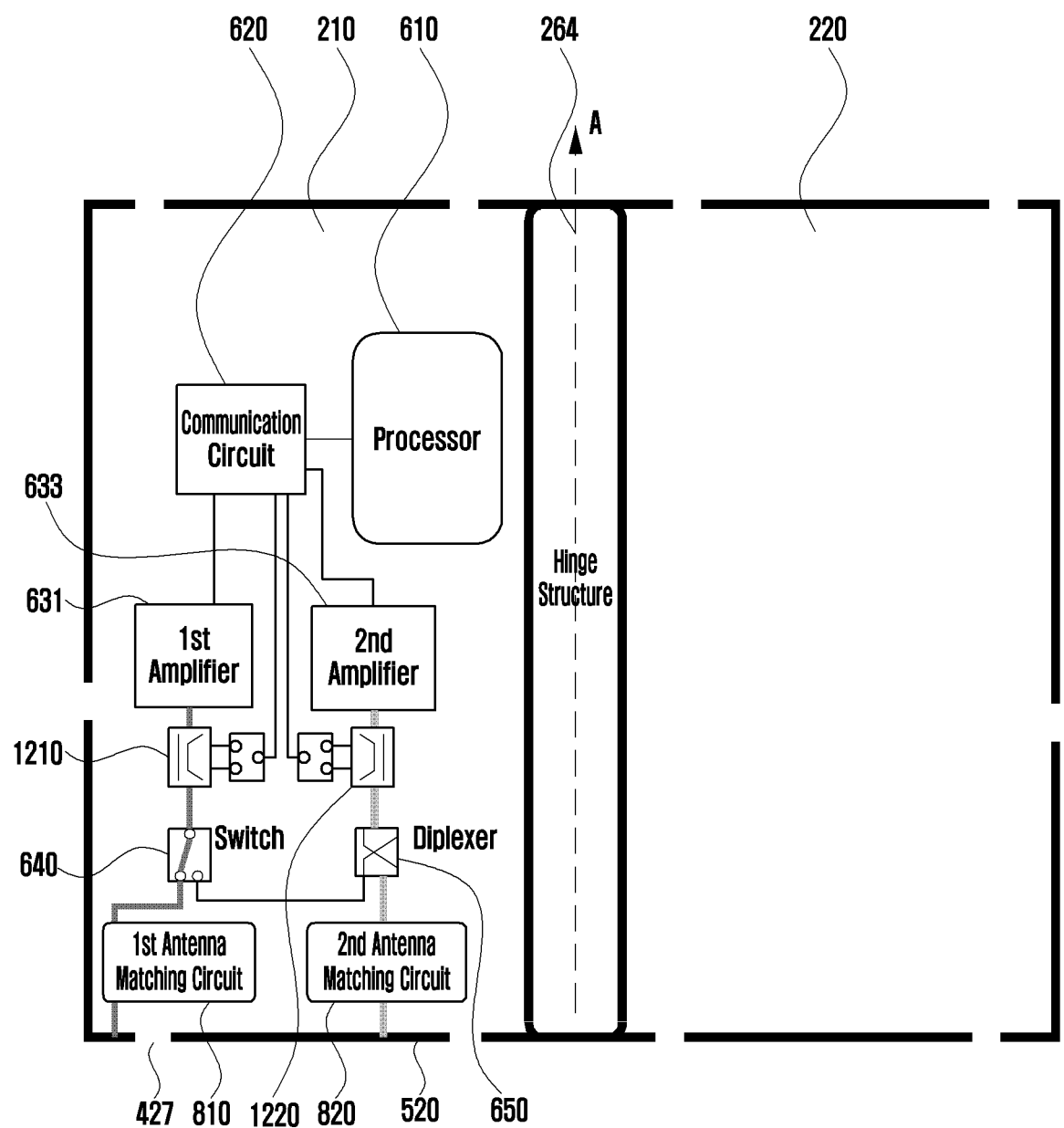
FIG. 12A is a block diagram of an electronic device according to an embodiment of the disclosure.

FIG. 12A is a block diagram of an electronic device according to an embodiment of the disclosure.

Figure 12B:
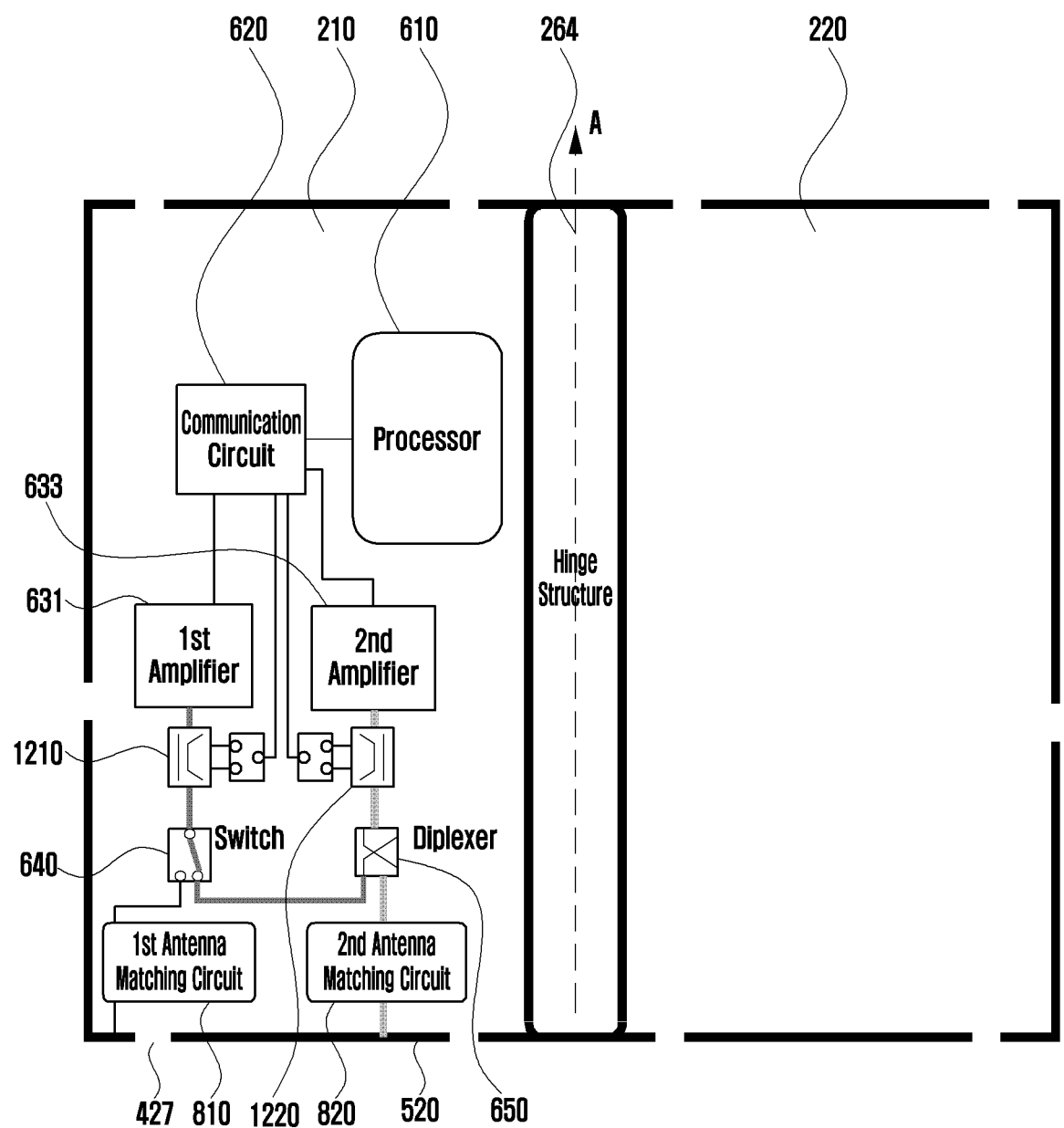
FIG. 12B is a block diagram of the electronic device according to an embodiment of the disclosure.

FIG. 12B is a block diagram of an electronic device according to an embodiment of the disclosure.

Specifically, FIGS. 12A and 12B are block diagrams of the electronic device 200 according to an embodiment in which a user's grip is detected using bidirectional couplers 1210 and 1220, instead of a grip sensor.

Referring to FIGS. 12A and 12B, the electronic device 200 according to various embodiments may detect whether a grip is present using the bidirectional couplers 1210 and 1220. For example, the processor 610 may calculate reflection loss information of the first antenna 510 or the second antenna 520 formed of a conductive portion through the bidirectional couplers 1210 and 1220, and may determine whether or not a user's body portion is present based on the calculated reflection loss information.

The electronic device 200 according to various embodiments may include a first bidirectional coupler 1210 and a second bidirectional coupler 1220. The first bidirectional coupler 1210 according to various embodiments may be disposed in an electrical path connecting the communication circuit 620 and the first antenna 510 to each other, and the second bidirectional coupler 1220 may be disposed in an electrical path connecting the communication circuit 620 and the second antenna 520 to each other.

The processor 610 according to various embodiments may calculate a reflection coefficient of an antenna using the bidirectional couplers 1210 and 1220. For example, using the bidirectional couplers 1210 and 1220, the processor 610 may recognize an incident wave and a reflected wave of a communication signal transmitted/received through an antenna, may calculate the amplitudes and phases of the voltages of the incident wave and reflected wave, and may calculate a reflection coefficient using the amplitudes and phases of the voltages of the incident wave and reflected wave. The processor 610 may determine whether a grip is generated by a user's body portion using the calculated reflection coefficient. For example, the processor 610 may calculate the reflection coefficient of the first antenna 510 using the first bidirectional coupler 1210 and may calculate the reflection coefficient of the second antenna 520 using the second bidirectional coupler 1220.

For example, the processor 610 may calculate the reflection coefficient of an antenna using Equation 1 below and using the bidirectional couplers 1210 and 1220.

$$\Gamma = \frac{V_-}{V_+} \qquad \text{Equation 1}$$

$\Gamma$ is a reflection coefficient, $V_+$ is a voltage of an incident wave, and $V_-$ is a voltage of a reflected wave. The reflection coefficient may mean, for example, a point on the coordinates of a Smith chart. The reflection coefficient may mean a degree of reflection by a difference in impedance of a load. For example, when the reflection coefficient is 0, it means that reflection has not occurred, when the reflection coefficient is 1, it means that reflection has occurred without a phase difference, and when the reflection coefficient is −1, it may mean that reflection has occurred with a phase difference.

$$\Gamma = \frac{Z_L - Z_0}{Z_L + Z_0} = \Gamma_r + j\Gamma_i \qquad \text{Equation 2}$$

The reflection coefficient may be represented by Equation 2. $Z_L$ may mean a load impedance, and $Z_0$ may mean a characteristic impedance of a transmission line.

$$z_l = \frac{Z_L}{Z_0} = r_l + jx_l = \frac{1 + (\Gamma_r + j\Gamma_i)}{1 - (\Gamma_r + j\Gamma_i)} \qquad \text{Equation 3}$$

$z_l$ may mean a normalized impedance of the load of the transmission line.

Using Equation 2 and Equation 3, the relationship between the reflection coefficient and the load impedance may be summarized and may be converted into formulas of circles of complex numbers in Equation 4 and Equation 5 below.

$$\left(\Gamma_r - \frac{r_l}{1 + r_l}\right)^2 + \Gamma_i^2 = \left(\frac{1}{1 + r_l}\right)^2 \qquad \text{Equation 4}$$

$$(\Gamma_r - 1)^2 + \left(\Gamma_i - \frac{1}{x_l}\right)^2 = \left(\frac{1}{x_l}\right)^2 \qquad \text{Equation 5}$$

The processor 610 may calculate reflection coefficients on the Smith chart using the bidirectional couplers 1210 and 1220, and the processor 610 may recognize whether a death grip occurs based on the calculated reflection coefficients.

The processor 610 according to various embodiments may calculate reflection loss information (e.g., a voltage standing wave ratio (VSWR)) using the bidirectional couplers 1210 and 1220. For example, the processor 610 may calculate the reflection loss information of the first antenna 510 using the first bidirectional coupler 1210 and may calculate the reflection loss information of the second antenna 520 using the second bidirectional coupler 1220. The bidirectional couplers 1210 and 1220 may transmit the calculated reflection loss information to the communication circuit 620. The processor 610 may calculate a reflection coefficient using the reflection loss information of each antenna. For example, the processor 610 may calculate the reflection coefficient of the first antenna 510 using the voltage standing wave ratio (VSWR) of the first antenna 510 received through the first bidirectional coupler 1210.

The processor 610 according to various embodiments may detect whether a grip occurs using the reflection loss information.

Referring to FIG. 12A, the processor 610 according to various embodiments may electrically connect the first amplifier 631 and the diplexer 650 to each other when a grip is detected. In this case, the first amplifier 631 may be electrically connected to the second antenna 520 via the diplexer 650. A low-frequency band communication signal output through the first amplifier 631 may be radiated through the second antenna 520 using the diplexer 650.

Referring to FIG. 12B, the processor 610 according to various embodiments may electrically connect the first amplifier 631 and the first antenna 510 to each other when no grip is detected. A low-frequency band communication signal output through the first amplifier 631 may be radiated through the first antenna 510.

The electronic device 200 according to various embodiments may determine a situation in which an antenna performance deterioration phenomenon may occur by detecting proximity of an external object using a bidirectional coupler.

An electronic device 200 according to various embodiments may include: a foldable housing (e.g., the pair of housing structures 210 and 220 in FIGS. 2A and 2B); a communication circuit 620; a first transmission/reception circuit configured to transmit/receive a signal in a first frequency band; a first antenna 510 electrically connected to the first transmission/reception circuit, and disposed on a portion of the first side member; a second transmission/reception circuit configured to transmit/receive a signal in a second frequency band different from the first frequency band; a second antenna 520 electrically connected to the second transmission/reception circuit, and disposed on a portion of the first side member; a grip sensor 660 configured to detect a contact of a user's body portion; and a processor 610. The foldable housing may include: a hinge structure 264; a first housing structure 210 connected to the hinge structure 264 and including a first surface oriented to face a first direction, a second surface oriented to face a second direction opposite to the first surface, and a first side member surrounding a first space between the first surface and the second surface; and a second housing structure 220 connected to the hinge structure 264 and including a third surface oriented to face a third direction, a fourth surface oriented to face a fourth direction opposite to the third direction, and a second side member surrounding a second space between the third surface and the fourth surface. The second housing structure 220 may be folded to the first housing structure 210 about the hinge structure 264, wherein, in a folded state, the third direction is opposite to the first direction, and in an unfolded state, the third direction is a same as the first direction. According to various embodiments, the processor 610 may be configured to cause the first transmission/reception circuit to be electrically connected to the second antenna 520 such that the signal in the first frequency band is transmitted/received through the second antenna 520 when the contact of the user's body portion is detected by the grip sensor 660.

According to various embodiments, in the electronic device 200, the first transmission/reception circuit may include a first amplifier 631 and a switch 640, the second transmission/reception circuit may include a second amplifier 633 and a diplexer 650 electrically connected to the second antenna 520, the switch 640 may electrically connect the first amplifier 631 to the first antenna 510 or the diplexer 650. According to various embodiments, the processor 610 may be configured to control the switch 640 such that the first amplifier 631 and the diplexer 650 are electrically connected to each other so as to cause the first transmission/reception circuit to be electrically connected to the second antenna 520.

In the electronic device 200 according to various embodiments, the processor 610 may be configured to control the switch 640 such that the first amplifier 631 and the first antenna 510 are electrically connected to each other when the contract of the user's body portion is not detected through the sensor 630.

In the electronic device 200 according to various embodiments, the first side member may include: a first side surface (e.g., the first side surface 410 in FIG. 4) arranged substantially parallel to the hinge structure 264; a second side surface (e.g., the second side surface 420 in FIG. 4) extending from one end of the first side surface to the hinge structure 264; and a third side surface (e.g., the third side surface 430 in FIG. 4) extending from another end of the first side surface to the hinge structure. The first antenna 510 may be a conductive portion (e.g., the fourth conductive portion 411 and the second conductive portion 423 in FIG. 4) disposed on at least a portion of the first side surface and the second side surface.

In the electronic device 200 according to various embodiments, the second antenna 520 may a conductive portion (e.g., the first conductive portion 421 in FIG. 4) disposed on at least a portion of the second side surface.

In the electronic device 200 according to various embodiments, the first antenna 510 and the second antenna 520 are separated from each other due to a non-conductive portion (e.g., the first non-conductive portion 427 in FIG. 4).

In the electronic device 200 according to various embodiments, the second side member may include: a fourth side surface arranged substantially parallel to the hinge structure 264; a fifth side surface extending from one end of the first side surface to the hinge structure 264; and a sixth side surface extending from another end of the first side surface to the hinge structure 264. The position where the grip sensor 660 is disposed may be symmetrical to the one end of the first antenna 510 with respect to the hinge structure 264 in the fourth side surface.

In the electronic device 200 according to various embodiments, the position where the grip sensor 660 is disposed may be a position adjacent to the one end of the first antenna 510 in the first side surface.

In the electronic device 200 according to various embodiments, the processor 610 may be configured to: measure a change value in capacitance through the grip sensor 660; and identify the contact of the user's body portion based on the measured change value in capacitance.

The electronic device 200 according to various embodiments may further include: a first antenna matching circuit 810 disposed in an electrical path connecting the first antenna 510 and the communication circuit 620 to each other; and a second antenna matching circuit 820 disposed in an electrical path connecting the second antenna 520 and the communication circuit 620 to each other.

An electronic device 200 according to various embodiments may include: a foldable housing; a communication circuit 620; a first transmission/reception circuit configured to transmit/receive a signal in a first frequency band; a first antenna 510 electrically connected to the first transmission/reception circuit, and disposed on a portion of the first side member; a second transmission/reception circuit configured to transmit/receive a signal in a second frequency band different from the first frequency band; a second antenna 520 electrically connected to the second transmission/reception circuit, and disposed on a portion of the first side member; a bidirectional coupler 1210 disposed in an electrical path connecting the communication circuit 620 and the first antenna 510 to each other; and a processor 610. The foldable housing may include: a hinge structure 264; a first housing structure 210 connected to the hinge structure 264 and including a first surface oriented to face a first direction, a second surface oriented to face a second direction opposite to the first surface, and a first side member surrounding a first space between the first surface and the second surface; and a second housing structure 220 connected to the hinge structure 264 and including a third surface oriented to face a third direction, a fourth surface oriented to face a fourth direction opposite to the third direction, and a second side member surrounding a second space between the third surface and the fourth surface. The second housing structure 220 may be folded to the first housing structure 210 about the hinge structure 264, wherein, in a folded state, the third direction is opposite to the first direction, and in an unfolded state, the third direction is a same as the first direction.

According to various embodiments, the processor 610 may be configured to cause the first transmission/reception circuit to be electrically connected to the second antenna 520 such that the signal in the first frequency band is transmitted/received through the second antenna 520 when the contact of the user's body portion is detected through the bidirectional coupler 1210.

In the electronic device 200 according to various embodiments, the first transmission/reception circuit may include a first amplifier 631 and a switch 640, the second transmission/reception circuit may include a second amplifier 633 and a diplexer 650 electrically connected to the second antenna 520, and the switch 640 may electrically connect the first amplifier 631 to the first antenna 510 or the diplexer 650. In the electronic device 200 according to various embodiments, the processor 610 may be configured to control the switch 640 such that the first amplifier 631 and the diplexer 650 are electrically connected to each other so as to cause the first transmission/reception circuit to be electrically connected to the second antenna 520.

In the electronic device 200 according to various embodiments, the processor 610 may be configured to control the switch 640 such that the first amplifier 631 and the first antenna 510 are electrically connected to each other when the contract of the user's body portion is not detected through the bidirectional coupler 1210.

In the electronic device 200 according to various embodiments, the processor 610 may be configured to: receive reflection loss information of the first antenna 510 through the bidirectional coupler 1210; and determine whether the contact of the user's body portion is detected based on the received reflection loss information.

In the electronic device 200 according to various embodiments, the reflection loss information of the first antenna 510 may include information on a voltage standing wave ratio of the first antenna 510, and the processor 610 may be configured to: calculate a reflection coefficient of the first antenna 510 based on the information on the standing wave ratio of the first antenna 510 provided through the bidirectional coupler; and determine whether the contact of the user's body portion is detected based on the calculated reflection coefficient.

In the electronic device 200 according to various embodiments, the first side member may include: a first side surface (e.g., the first side surface 410 in FIG. 4) arranged substantially parallel to the hinge structure 264; a second side surface (e.g., the second side surface 420 in FIG. 4) extending from one end of the first side surface to the hinge structure 264; and a third side surface (e.g., the third side surface 430 in FIG. 4) extending from another end of the first side surface to the hinge structure. The first antenna 510 may be a conductive portion (e.g., the fourth conductive portion 411 and the second conductive portion 423 in FIG. 4) disposed on at least a portion of the first side surface and the second side surface.

In the electronic device 200 according to various embodiments, the second antenna 520 may a conductive portion (e.g., the first conductive portion 421 in FIG. 4) disposed on at least a portion of the second side surface.

In the electronic device 200 according to various embodiments, the first antenna 510 and the second antenna 520 are separated from each other due to a non-conductive portion (e.g., the first non-conductive portion 427 in FIG. 4).

The electronic device 200 according to various embodiments may further include: a first antenna matching circuit 810 disposed in an electrical path connecting the first antenna 510 and the communication circuit 620 to each other; and a second antenna matching circuit 820 disposed in an electrical path connecting the second antenna 520 and the communication circuit 620 to each other.

In the electronic device 200 according to various embodiments, the processor 610 may be configured to: detect the folded state of the electronic device 200; and control the switch 640 when the electronic device 200 is in the folded state.

Figure 13A:
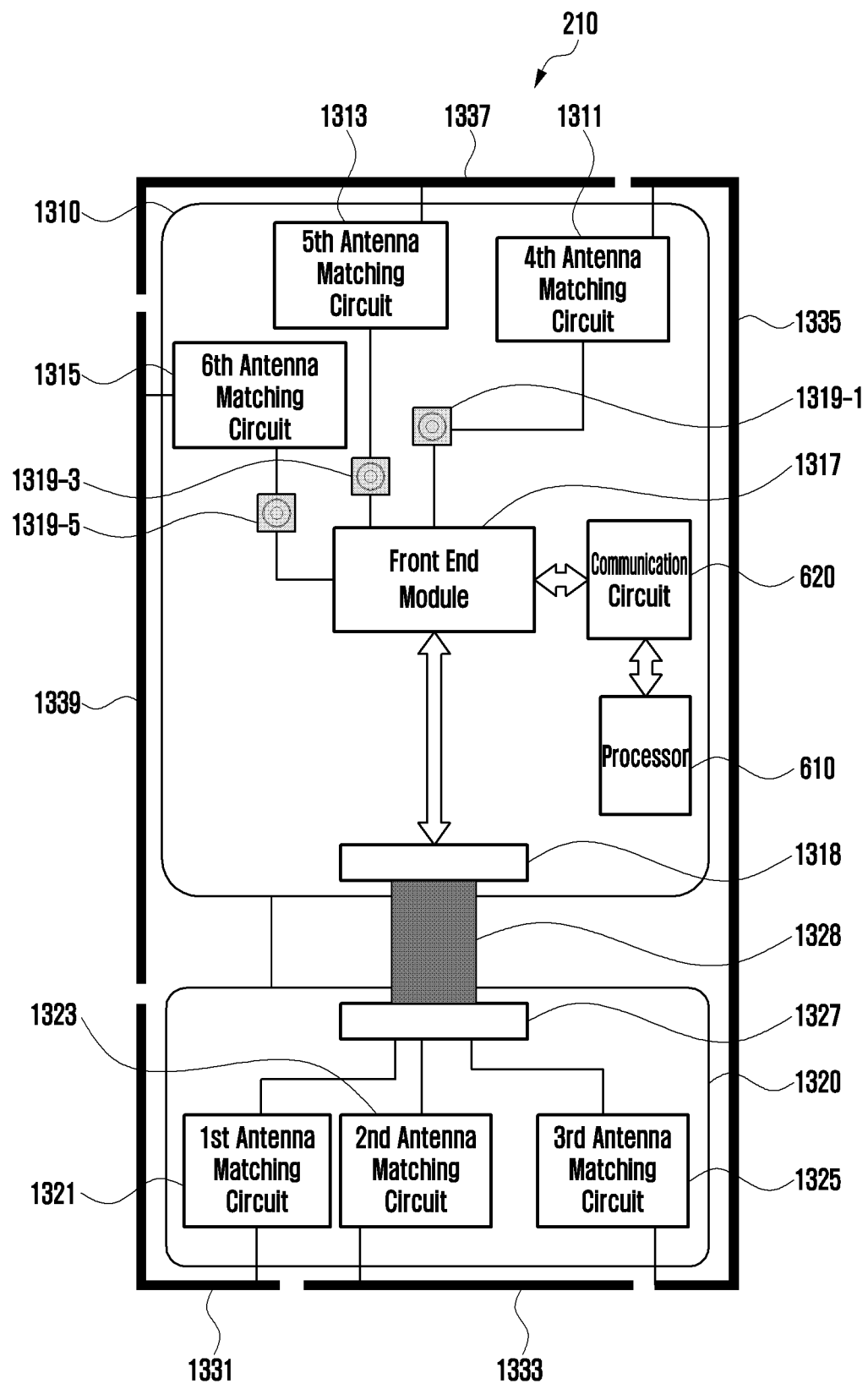
FIG. 13A is a block diagram illustrating components disposed inside a first housing structure of an electronic device according to an embodiment of the disclosure.

FIG. 13A is a block diagram illustrating components disposed inside a first housing structure of an electronic device (e.g., the electronic device in FIG. 1) according to an embodiment of the disclosure.

Referring to FIG. 13A, the electronic device 101 according to various embodiments may include at least two printed circuit boards (PCBs) (or a printed board assembly (PBA)) (e.g., a first PCB 1310 and a second PCB 1320) disposed inside the first housing structure 210 so as to arrange various components thereon.

According to various embodiments, the first PCB 1310 and the second PCB 1320 may be electrically connected to each other. The second PCB 1320 may include a connector 1327 for electrical connection with the first PCB 1310. The second PCB 1320 may be connected to the first PCB 1310 via a flexible RF cable (FRC) 1328 connected between a connector 1318 connected to the communication circuit 620 and a connector 1327. The second PCB 1320 may include a first antenna matching circuit 1321 (e.g., the first antenna matching circuit 810 in FIG. 8A) electrically connected to the first antenna 1331 and configured to perform impedance matching with the first antenna 1331, a second antenna matching circuit 1323 (e.g., the second antenna matching circuit 820 in FIG. 8A) electrically connected to the second antenna 1333 and configured to perform impedance matching with the second antenna 1333, and a third antenna matching circuit 1325 electrically connected to the third antenna 1335 and configured to perform impedance matching with the third antenna 1335.

According to various embodiments, the first housing structure 210 may include one or more antennas configured to radiate a signal transmitted by the communication circuit 620 or to receive a signal from the outside (e.g., a first antenna 1331, a second antenna 1333, a third antenna 1335, a fourth antenna 1337, and/or a fifth antenna 1339). The one or more antennas 1331, 1333, 1335, 1337, and 1339 may be implemented on a side surface (e.g., the first side surface 410) of the first housing structure 210, and a non-conductive portion (e.g., the third non-conductive portion 413 in FIG. 4) may be included between the one or more antennas 1331, 1333, 1335, 1337, and 1339.

According to various embodiments, the first PCB 1310 may include various components of the electronic device 101. According to an embodiment, the processor 610 and the communication circuit 620 of the electronic device 101 and a front end module 1317 including components for amplifying a signal received by an antenna or a signal to be radiated through the antenna or for removing noise (e.g., an amplifier or a filter) may be included.

According to various embodiments, the front end module 1317 may be electrically connected to the third antenna 1335 so as to amplify a signal received through the third antenna 1335 or perform a process to remove noise.

According to various embodiments, the front end module 1317 may include a fourth antenna matching circuit 1311 electrically connected to the third antenna 1335 and configured to perform impedance matching with the third antenna 1335, a fifth antenna matching circuit 1313 electrically connected to the fourth antenna 1337 and configured to perform impedance matching with the fourth antenna 1337, and/or a sixth antenna matching circuit 1315 electrically connected to the fifth antenna 1339 and configured to perform impedance matching with the fifth antenna 1339.

According to various embodiments, it may be necessary to calibrate signal transmission lines (e.g., a transmission line from the front end module 1317 to the third antenna 1335, a transmission line from the front end module 1317 to the fourth antenna 1337, and a transmission line from the front end module 1317 to the fifth antenna 1339) disposed on the first PCB 1310 and the second PCB 1320 due to variations in components in the transmission lines.

According to various embodiments, for the calibration of transmission lines (e.g., a transmission line from the communication circuit 620 to the first antenna 1331, a transmission line from the communication circuit 620 to the second antenna 1333, and a transmission line from the communication circuit 620 to the third antenna 1335) implemented on the second PCB 1320, a separate external device that performs calibration may be connected via a connector 1327. The external device may be connected via the connector 1327 so as to calibrate the transmission lines implemented on the second PCB 1320.

However, for the calibration of the transmission lines implemented on the first PCB 1310, a port to which a separate external device that performs calibration is connected may be required. To this end, for calibration of the transmission lines (e.g., a transmission line from the front end module 1317 to the third antenna 1335, a transmission line from the front end module 1317 to the fourth antenna 1337, and a transmission line from the front end module 1317 to the fifth antenna 1339) implemented on the first PCB 1310, the first PCB 1310 may include separate connectors 1319-1, 1319-3, and 1319-5 for connection with separate external devices that perform calibration. The separate device (not illustrated) configured to perform calibration may be connected to a connector 1318 connected to the connectors 1319-1, 1319-3, and 1319-5 and the communication circuit 620 so as to perform calibration of the transmission lines (e.g., the transmission line from the front end module 1317 to the third antenna 1335, the transmission line from the front end module 1317 to the fourth antenna 1337, and the transmission line from the front end module 1317 to the fifth antenna 1339) implemented on the first PCB 1310.

However, as the number of transmission lines implemented on the first PCB 1310 to be calibrated increases, the number of components (e.g., the fourth antenna matching circuit 1311, the fifth antenna matching circuit 1313, and/or the sixth antenna matching circuit 1315) included in the transmission lines may increase, and the number of connectors 1319-1, 1319-3, and 1319-5 for connection with external devices that perform calibration also increases. As the number of connectors 1319-1, 1319-3, and 1319-5 increases, there may be a problem in that the space in which other components are disposed decreases.

Hereinafter, an embodiment of a connector capable of reducing a mounting space will be described.

Figure 13B:
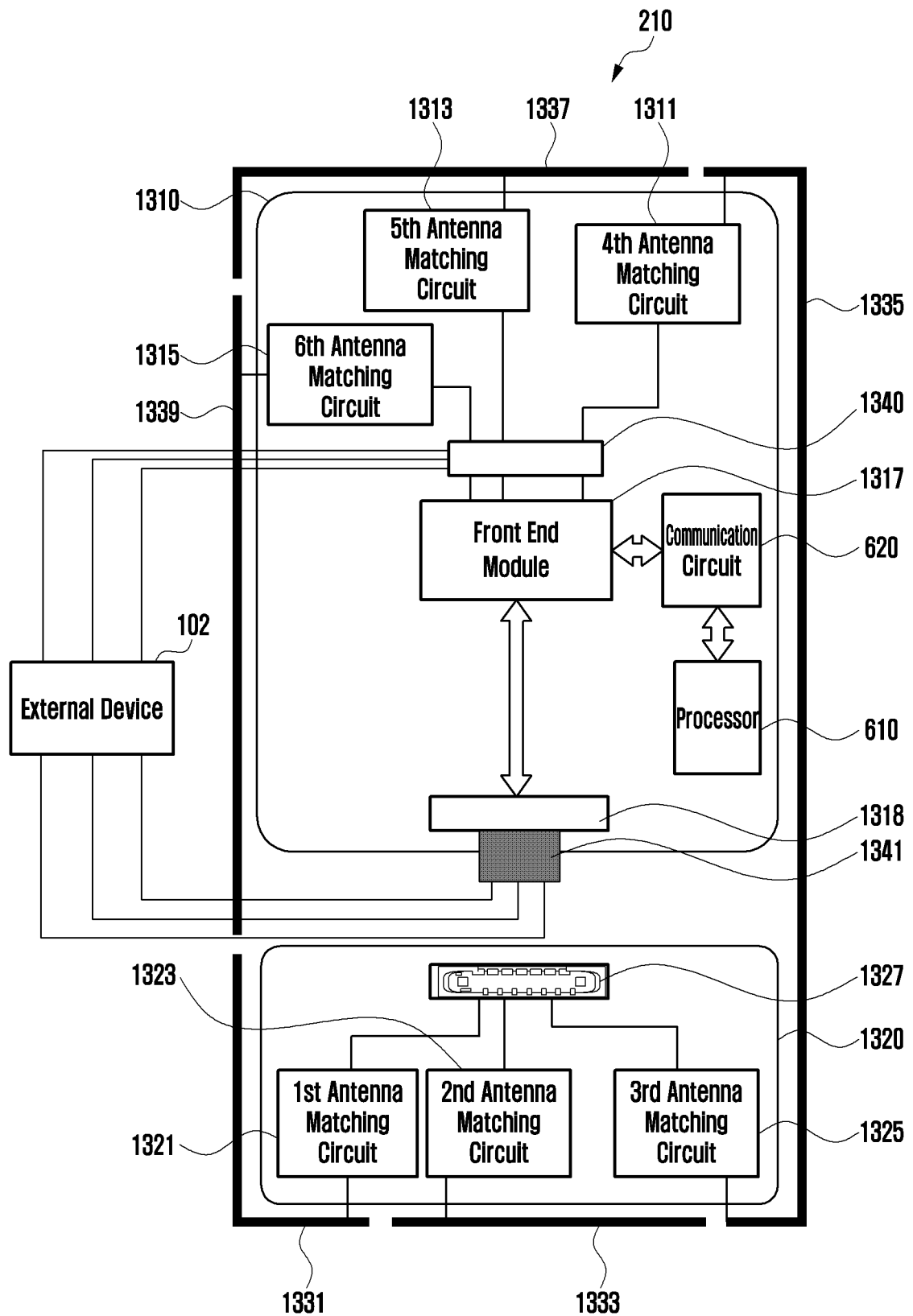
FIG. 13B is a block diagram illustrating components disposed inside a first housing structure of an electronic device according to an embodiment of the disclosure.

FIG. 13B is a block diagram illustrating components disposed inside a first housing structure of an electronic device (e.g., the electronic device in FIG. 1) according to an embodiment of the disclosure.

Referring to FIG. 13B, the first PCB 1310 may include one connector 1340 electrically connected between the fourth antenna matching circuit 1311, the fifth antenna matching circuit 1313, and/or the sixth antenna matching circuit 1315, and the front end module 1317.

The connector 1340 may include a connection part (e.g., a connection part 1350 in FIG. 13C) that implements an electrical connection between the fourth antenna matching circuit 1311, the fifth antenna matching circuit 1313, and/or the sixth antenna matching circuit 1315, and the front end module 1317. The external device 102 performing calibration may include a second connector (not illustrated) having a shape corresponding to the shape of the connector 1340 (e.g., a shape capable of being physically coupled to the connector 1340). The connector 1340 may be physically coupled to a second connector (not illustrated) having a shape corresponding to the shape of the connector 1340.

The external device 102 performing calibration may be connected to the connector 1318 via a flexible RF cable (FRC) 1341. The external device 102 may be connected to the connector 1318 through a flexible RF cable (FRC) 1341. The external device 102 performing calibration may be electrically connected to the connector 1340 in the state in which the connector 1340 and the second connector are physically coupled to each other.

According to various embodiments, the transmission lines implemented on the first PCB 1310 may be calibrated by the separate external device 102 performing calibration in the state in which the first rear cover 240 and/or the second rear cover 250 are not assembled to the first housing structure 210 and/or the second housing structure 220.

According to various embodiments, when the connector 1340 is implemented integrally, it may occupy a space smaller than the space occupied by the connectors 1319-1, 1319-3, and 1319-5 illustrated in FIG. 13A.

Figure 13C:
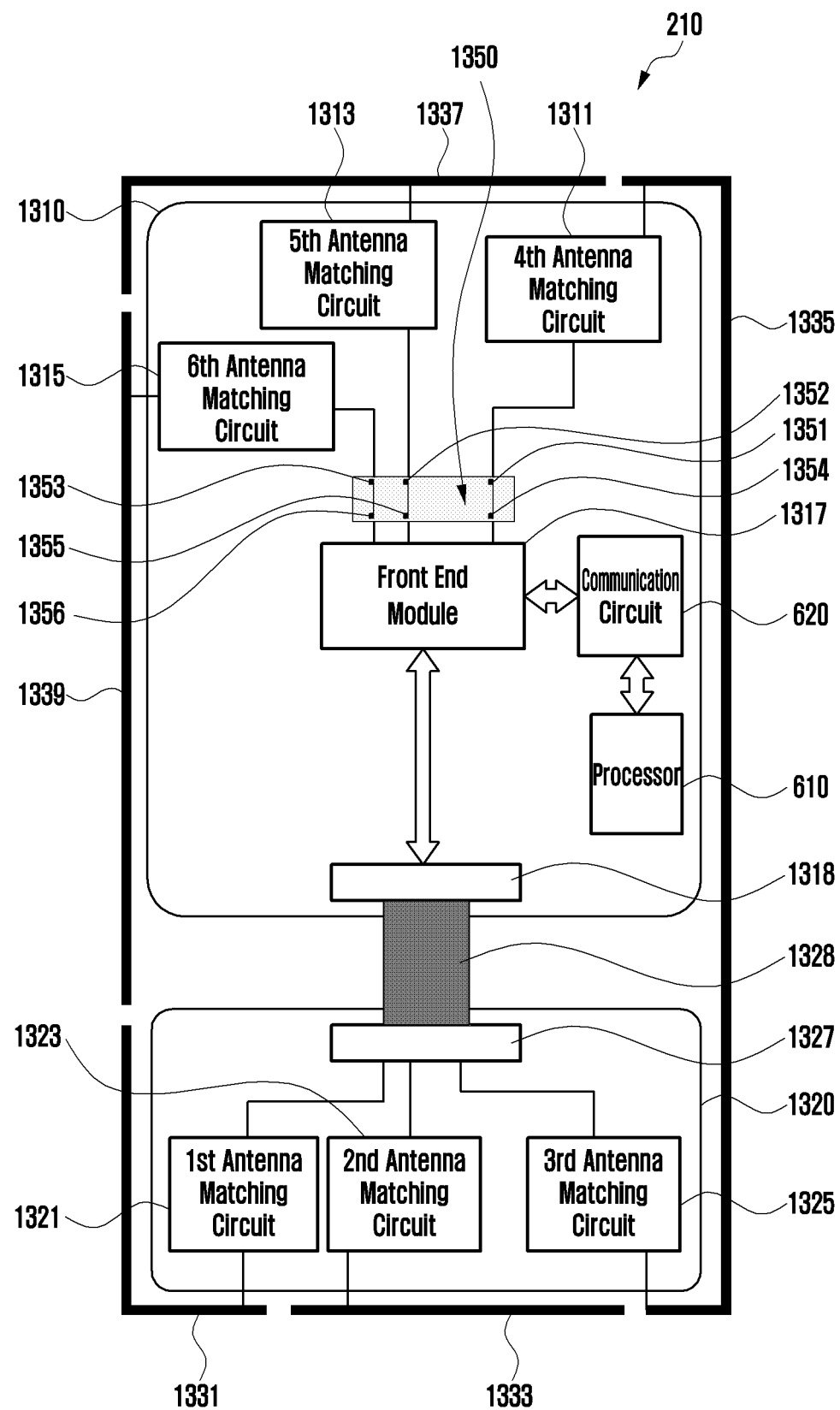
FIG. 13C is a block diagram illustrating components disposed inside a first housing structure of an electronic device according to an embodiment of the disclosure.

FIG. 13C is a block diagram illustrating components disposed inside a first housing structure of an electronic device (e.g., the electronic device in FIG. 1) according to an embodiment of the disclosure.

Referring to FIG. 13C, the connection part 1350 of the connector 1340 is illustrated.

The connector 1340 or the connection part 1350 may include a first port 1351, which is electrically connected to the fourth antenna matching circuit 1311, a second port 1352, which is electrically connected to the fifth antenna matching circuit 1313, a third port 1353, which is electrically connected to the sixth antenna matching circuit 1315, and a fourth port 1354, a fifth port 1355, and a sixth port 1356, which are electrically connected to the front end module.

According to various embodiments, the connection part 1350 may be implemented in the state in which the first port 1351 and the fourth port 1354 are electrically connected. The fourth antenna matching circuit 1311 may be electrically connected to the front end module 1317 via the first port 1351 and the fourth port 1354.

According to various embodiments, the connection part 1350 may be implemented in the state in which the second port 1352 and the fifth port 1355 are electrically connected to each other. The fifth antenna matching circuit 1313 may be electrically connected to the front end module 1317 via the second port 1352 and the fifth port 1355.

According to various embodiments, the connection part 1350 may be implemented in the state in which the third port 1353 and the sixth port 1356 are electrically connected to each other. The sixth antenna matching circuit 1315 may be electrically connected to the front end module 1317 via the third port 1353 and the sixth port 1356.

According to various embodiments, the first PCB 1310 and the second PCB 1320 may be electrically connected each other via the connector 1318 and the FRC 1328. The communication circuit 620 may transmit a signal to the first antenna 1331 and the second antenna 1333 via the transmission lines implemented on the second PCB 1320.

According to various embodiments, the transmission lines (e.g., the transmission line from the front end module 1317 to the third antenna 1335, the transmission line from the front end module 1317 to the fourth antenna 1337, and the transmission line from the front end module 1317 to the fifth antenna 1339) implemented on the first PCB 1310 and components included in the transmission lines may be calibrated by a separate external device that performs calibration (e.g., the external device 102 in FIG. 13B) in the state in which the second connector (not illustrated) and the connector 1340 are coupled.

According to various embodiments, the separate external device 102 that performs calibration may be electrically connected to the first port 1351 so as to calibrate the transmission line between the third antenna 1335 and the front end module 1317.

According to various embodiments, the separate external device 102 that performs calibration may be electrically connected to the second port 1352 so as to calibrate the transmission line between the fourth antenna 1337 and the front end module 1317.

According to various embodiments, the separate external device 102 that performs calibration may be electrically connected to the third port 1353 so as to calibrate the transmission line between the fifth antenna 1339 and the front end module 1317.

Figure 14:
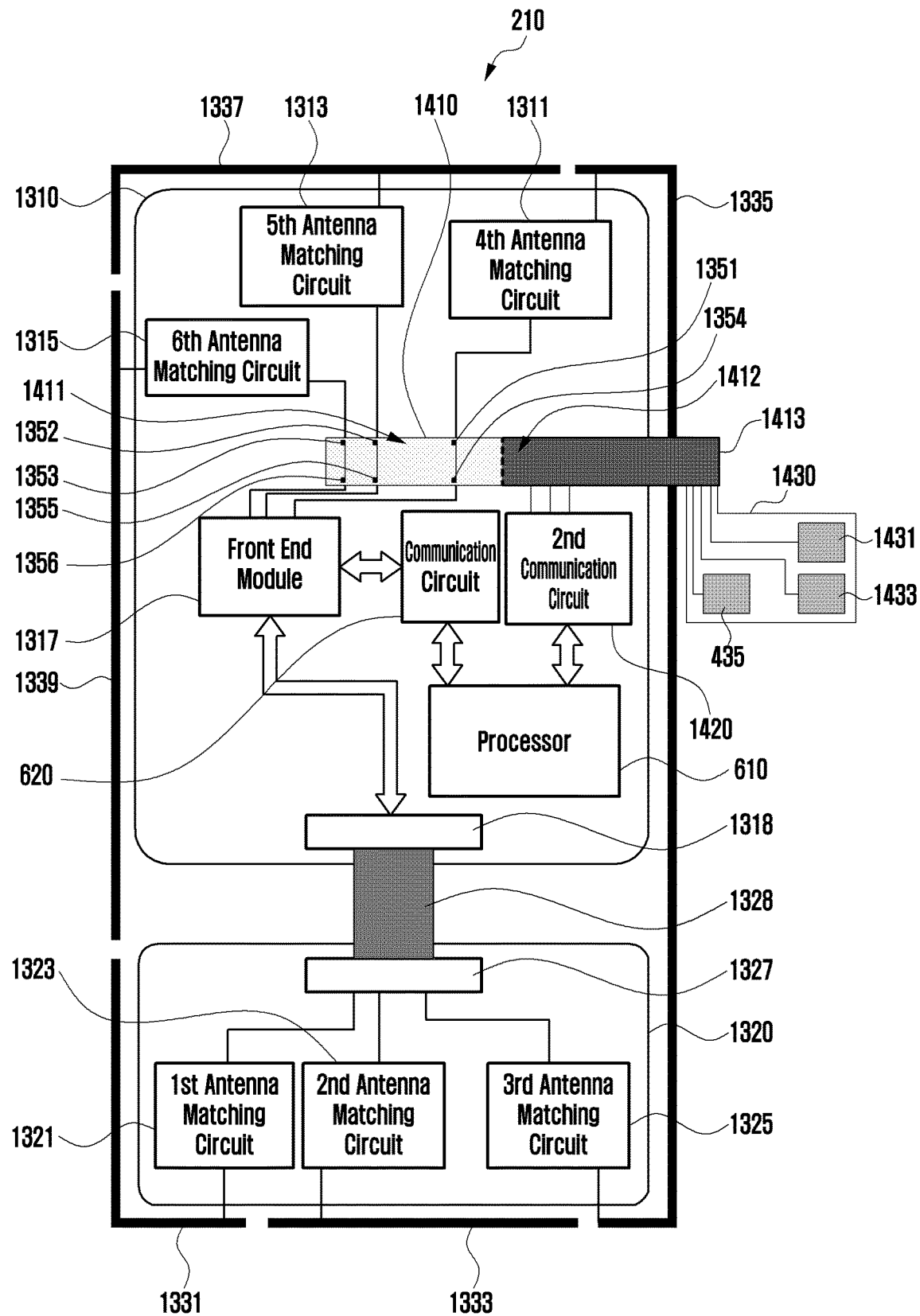
FIG. 14 is a block diagram illustrating components disposed inside a first housing structure of an electronic device according to an embodiment of the disclosure.

FIG. 14 is a block diagram illustrating components disposed inside a first housing structure of an electronic device (e.g., the electronic device in FIG. 1) according to an embodiment of the disclosure.

Referring to FIG. 14, according to various embodiments, the electronic device 101 may support first communication through the first communication circuit 620 and/or second communication different from the first communication through the second communication circuit 1420. According to an embodiment, the first communication may be cellular communication, and the second communication may be short-range wireless communication (e.g., ultra-wide band (UWB), Bluetooth, or Wi-Fi).

According to various embodiments, the second communication circuit 1420 may perform communication through the second communication. According to an embodiment, the second communication circuit 1420 is electrically connected to a second communication antenna array 1430 configured to receive a signal in a frequency band corresponding to the second communication so as to transmit a signal in a frequency band corresponding to the second communication or to receive a signal in a frequency band corresponding to the second communication from the outside. The second communication circuit 1420 may be disposed on the first PCB 1310 and may be electrically connected to the processor 610.

According to various embodiments, the second communication antenna array 1430 may include one or more antennas (e.g., the sixth antenna 1431, the seventh antenna 435, and/or the eighth antenna 1433) as components for receiving or outputting a signal in a frequency band corresponding to the second communication. The second communication antenna array 1430 may be electrically connected to the second communication circuit 1420. According to various embodiments, the second communication antenna array 1430 may be disposed at various positions on the first PCB 1310. For example, the second communication antenna array 1430 may be disposed on the side surface of the first PCB 1310. When the second communication antenna array 1430 is disposed on the side surface of the first PCB 1310, the second communication antenna array 1430 may be electrically connected to the second communication circuit 1420 via a flexible printed circuit board (FPCB) 1412.

According to various embodiments, the connector 1410 may be disposed on the first PCB 1310, and may include a first region 1411, in which electrical connection between the fourth antenna matching circuit 1311, the fifth antenna matching circuit 1313 and/or the sixth antenna matching circuit 1315, and the front end module 1317, is implemented, and a second region 1413, in which electrical connection between the second communication antenna array 1430 and the second communication circuit 1420 is implemented. The connector 1410 may be electrically connected to the second communication antenna array 1430 via an FPCB 1412. The FPCB 1412 may be connected to a fourth connector (not illustrated) having a shape corresponding to the shape of the second region 1413 of the connector 1410 (e.g., a shape capable of being physically coupled to the second region 1413 of the connector 1410). In this case, the FPCB 1412 may be electrically connected to the second communication circuit 1420 through physical coupling between the second region 1413 and the fourth connector (not illustrated).

According to another embodiment, the FPCB 1412 may be connected to a fourth connector (not illustrated) having a shape corresponding to the shape of the connector 1410 (e.g., a shape capable of being physically coupled to the connector 1410). The fourth connector (not illustrated) may be electrically connected to a port implemented in the second region 1422 without being electrically connected to the ports (e.g., the first port 1351, the second port 1352, the third port 1353, the fourth port 1354, the fifth port 1355, and/or the sixth port 1356) implemented in the first region 1411. In this case, the FPCB 1412 may be electrically connected to the second communication circuit 1420 through the physical coupling between the connector 1410 and the fourth connector (not illustrated). According to various embodiments, the second communication antenna array 1430 and/or the second communication circuit 1420 may be calibrated by a separate external device (not illustrated) that performs calibration, connected thereto through the connector 1410.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a foldable housing including:
        a hinge structure;
        a first housing structure connected to the hinge structure and including a first surface oriented to face a first direction, a second surface oriented to face a second direction opposite to the first surface, and a first side member surrounding a first space between the first surface and the second surface; and
        a second housing structure connected to the hinge structure and including a third surface oriented to face a third direction, a fourth surface oriented to face a fourth direction opposite to the third direction, and a second side member surrounding a second space between the third surface and the fourth surface, the second housing structure being folded to the first housing structure about the hinge structure, wherein, in a folded state, the third direction is opposite to the first direction, and in an unfolded state, the third direction is a same as the first direction;
    a communication circuit;
    a first transmission/reception circuit configured to transmit/receive a signal in a first frequency band;
    a first antenna electrically connected to the first transmission/reception circuit, and disposed on a portion of the first side member of the first housing structure;
    a second transmission/reception circuit configured to transmit/receive a signal in a second frequency band different from the first frequency band;
    a second antenna electrically connected to the second transmission/reception circuit, and disposed on a portion of the first side member;
    a sensor disposed in the second housing structure configured to detect a contact of a user's body portion on a part of the first antenna, wherein the sensor is located adjacent to a part of the first antenna when the electronic device is in the folded state; and
    a processor,
    wherein the processor is configured to:
        cause the first transmission/reception circuit to be electrically connected to the first antenna such that the signal in the first frequency band is transmitted/received through the first transmission/reception circuit and the first antenna when the contact of the user's body portion is not detected by the sensor and the electronic device is in the folded state, and
        cause the first transmission/reception circuit to be electrically connected to the second antenna such that the signal in the first frequency band is transmitted/received through the first transmission/reception circuit and the second antenna when the contact of the user's body portion is detected by the sensor and the electronic device is in the folded state.

2. The electronic device of claim 1,
wherein the first transmission/reception circuit comprises a first amplifier and a switch,
wherein the second transmission/reception circuit comprises a second amplifier and a diplexer electrically connected to the second antenna,
wherein the switch electrically connects the first amplifier to the first antenna or the diplexer, and
wherein the processor is further configured to:
control the switch such that the first amplifier and the diplexer are electrically connected to each other so as to cause the first transmission/reception circuit to be electrically connected to the second antenna.

3. The electronic device of claim 2, wherein the processor is further configured to control the switch such that the first amplifier and the first antenna are electrically connected to each other when the contact of the user's body portion is not detected through the sensor.

4. The electronic device of claim 1,
wherein the first side member comprises:
a first side surface arranged substantially parallel to the hinge structure;
a second side surface extending from one end of the first side surface to the hinge structure; and
a third side surface extending from another end of the first side surface to the hinge structure, and
wherein the first antenna is a conductive portion disposed on at least a portion of the first side surface and the second side surface.

5. The electronic device of claim 4, wherein the second antenna is a conductive portion disposed on at least a portion of the second side surface.

6. The electronic device of claim 5, wherein the first antenna and the second antenna are separated from each other due to a non-conductive portion.

7. The electronic device of claim 4,
wherein the second side member comprises:
a fourth side surface arranged substantially parallel to the hinge structure;
a fifth side surface extending from one end of the first side surface to the hinge structure; and
a sixth side surface extending from another end of the first side surface to the hinge structure, and
wherein a position where the sensor is disposed is symmetrical to the one end of the first antenna with respect to the hinge structure in the fourth side surface.

8. The electronic device of claim 4, wherein a position where the sensor is disposed is a position adjacent to the one end of the first antenna in the first side surface.

9. The electronic device of claim 1, wherein the processor is further configured to:
measure a change value in capacitance through the sensor; and
identify whether the user's body portion comes into contact based on the measured change value in capacitance.

10. The electronic device of claim 1, further comprising:
a first antenna matching circuit disposed in an electrical path connecting the first antenna and the communication circuit to each other; and
a second antenna matching circuit disposed in an electrical path connecting the second antenna and the communication circuit to each other.

11. An electronic device comprising:
a foldable housing including:
a hinge structure;
a first housing structure connected to the hinge structure and including a first surface oriented to face a first direction, a second surface oriented to face a second direction opposite to the first surface, and a first side member surrounding a first space between the first surface and the second surface; and
a second housing structure connected to the hinge structure and including a third surface oriented to face a third direction, a fourth surface oriented to face a fourth direction opposite to the third direction, and a second side member surrounding a second space between the third surface and the fourth surface, the second housing structure being folded to the first housing structure about the hinge structure, wherein, in a folded state, the third direction is opposite to the first direction, and in an unfolded state, the third direction is a same as the first direction;
a communication circuit;
a first transmission/reception circuit configured to transmit/receive a signal in a first frequency band;
a first antenna electrically connected to the first transmission/reception circuit, and disposed on a portion of the first side member;
a second transmission/reception circuit configured to transmit/receive a signal in a second frequency band different from the first frequency band;
a second antenna electrically connected to the second transmission/reception circuit, and disposed on a portion of the first side member;
a switch configured to connect between the first transmission/reception circuit and one of the first antenna and the second antenna;
a first bidirectional coupler disposed in an electrical path connecting the communication circuit and the first antenna to each other;
a second bidirectional coupler disposed in an electrical path connecting the communication circuit and the second antenna to each other; and
a processor,
wherein the processor is configured to:
identify whether a user's body portion is contacting the electronic device based on reflection loss information generated by the first bidirectional coupler and the second bidirectional coupler,
in response to identifying that a contact of a user's body portion is not detected through the bidirectional coupler, control the switch to electrically connect the first transmission/reception circuit to the first antenna such that the signal in the first frequency band is transmitted/received through the first transmission/reception circuit and the first antenna,
in response to identifying that the contact of a user's body portion is detected through the bidirectional coupler, control the switch to electrically connect the first transmission/reception circuit to the second antenna such that the signal in the first frequency band is transmitted/received through the first transmission/reception circuit and the second antenna.

12. The electronic device of claim 11,
wherein the first transmission/reception circuit comprises a first amplifier,
wherein the second transmission/reception circuit comprises a second amplifier and a diplexer electrically connected to the second antenna, wherein the switch electrically connects the first amplifier to the first antenna or the diplexer, and wherein the processor is further configured to:
control the switch such that the first amplifier and the diplexer are electrically connected to each other so as to cause the first transmission/reception circuit to be electrically connected to the second antenna.

13. The electronic device of claim 12, wherein the processor is further configured to:
control the switch such that the first amplifier and the first antenna are electrically connected to each other when the contact of the user's body portion is not detected through the bidirectional coupler.

14. The electronic device of claim 11, wherein the processor is further configured to:
receive reflection loss information of the first antenna through the bidirectional coupler; and
determine whether the contact of the user's body portion is detected based on the received reflection loss information.

15. The electronic device of claim 14,
wherein the reflection loss information of the first antenna includes information on a voltage standing wave ratio of the first antenna, and
wherein the processor is further configured to:
calculate a reflection coefficient of the first antenna based on the information on the standing wave ratio of the first antenna provided through the bidirectional coupler; and
determine whether the contact of the user's body portion is detected based on the calculated reflection coefficient.

16. The electronic device of claim 11,
wherein the first side member comprises:
a first side surface arranged substantially parallel to the hinge structure;
a second side surface extending from one end of the first side surface to the hinge structure; and
a third side surface extending from another end of the first side surface to the hinge structure, and
wherein the first antenna is a conductive portion disposed on at least a portion of the first side surface and the second side surface.

17. The electronic device of claim 16, wherein the second antenna is a conductive portion disposed on at least a portion of the second side surface.

18. The electronic device of claim 17, wherein the first antenna and the second antenna are separated from each other due to a non-conductive portion.

19. The electronic device of claim 11, further comprising:
a first antenna matching circuit disposed in an electrical path connecting the first antenna and the communication circuit to each other; and
a second antenna matching circuit disposed in an electrical path connecting the second antenna and the communication circuit to each other.

20. The electronic device of claim 12, wherein the processor is further configured to:
detect a folded state of the electronic device; and
control the switch when the electronic device is in the folded state.

* * * * *